United States Patent
Onishi

(10) Patent No.: US 12,067,250 B2
(45) Date of Patent: Aug. 20, 2024

(54) MEMORY SYSTEM WITH MEMORY AND CONTROLLER

(71) Applicant: Kioxia Corporation, Tokyo (JP)

(72) Inventor: Shohei Onishi, Kawasaki Kanagawa (JP)

(73) Assignee: Kioxia Corporation, Tokyo (JP)

(*) Notice: Subject to any disclaimer, the term of this patent is extended or adjusted under 35 U.S.C. 154(b) by 145 days.

(21) Appl. No.: 17/688,385

(22) Filed: Mar. 7, 2022

(65) Prior Publication Data
US 2023/0004306 A1 Jan. 5, 2023

(30) Foreign Application Priority Data

Jul. 2, 2021 (JP) ................. 2021-110810

(51) Int. Cl.
*G06F 3/06* (2006.01)
(52) U.S. Cl.
CPC .......... *G06F 3/0616* (2013.01); *G06F 3/0647* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 10,223,273 B2 | 3/2019 | Yang et al. | |
| 10,868,679 B1* | 12/2020 | Van Antwerpen | G06F 21/575 |
| 2016/0239205 A1* | 8/2016 | Rothberg | G06F 3/0604 |
| 2016/0284393 A1* | 9/2016 | Ramalingam | G11C 16/3495 |
| 2019/0138457 A1 | 5/2019 | Kumar et al. | |
| 2021/0034555 A1 | 2/2021 | Lalam | |

FOREIGN PATENT DOCUMENTS

JP 6408712 B2 10/2018

\* cited by examiner

Primary Examiner — Michael Alsip
(74) Attorney, Agent, or Firm — Foley & Lardner LLP

(57) ABSTRACT

According to one embodiment, a memory system includes a non-volatile memory and a controller. The controller controls writing of data to the non-volatile memory or reading of data from the non-volatile memory in response to a command from a host. The controller manages a first area and a second area in a memory space provided to the host, to which an area of the non-volatile memory is mapped. The first area is an area used by the host as a main memory. The second area is an area where valid data is stored.

19 Claims, 24 Drawing Sheets

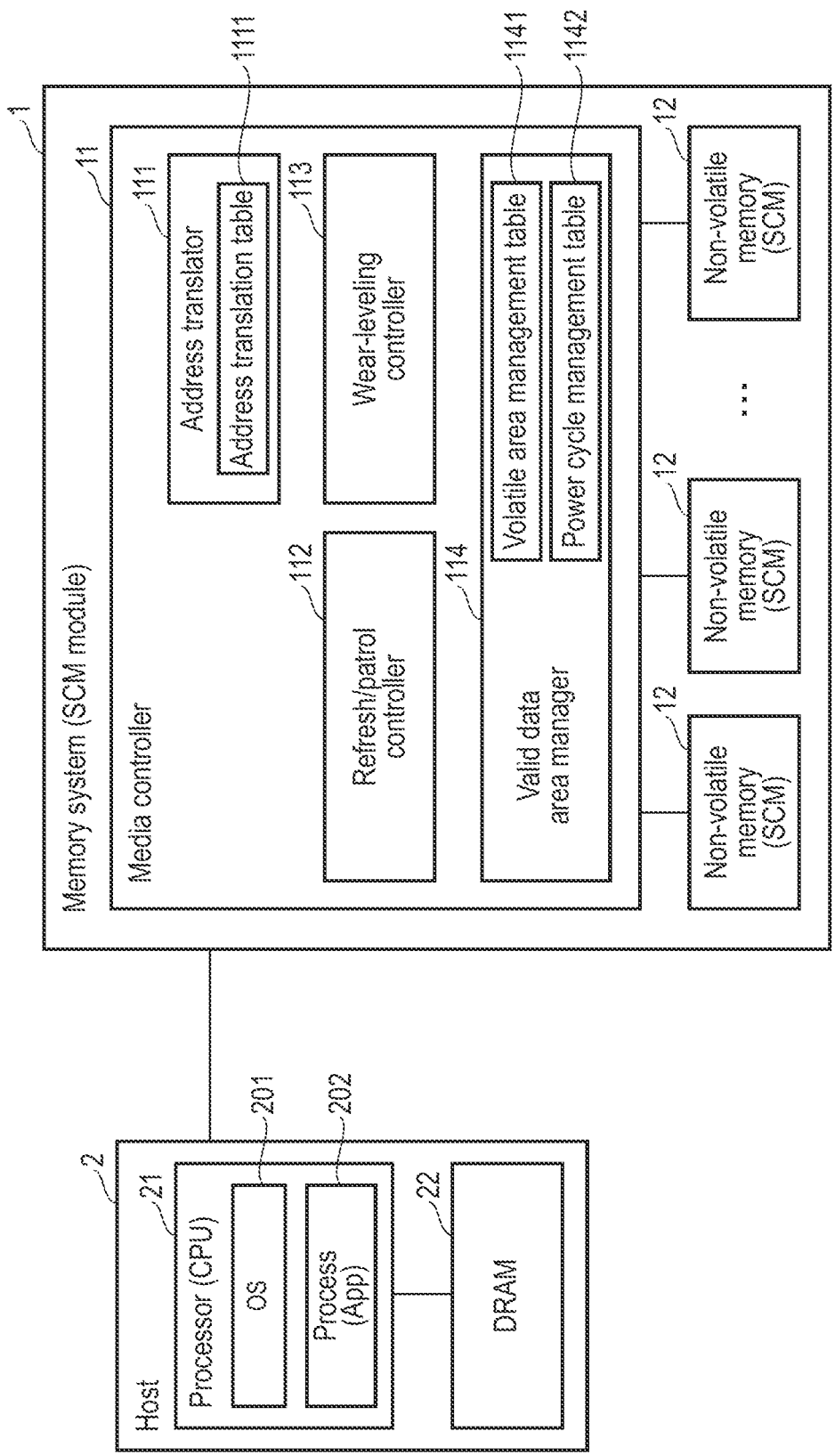
F I G. 1

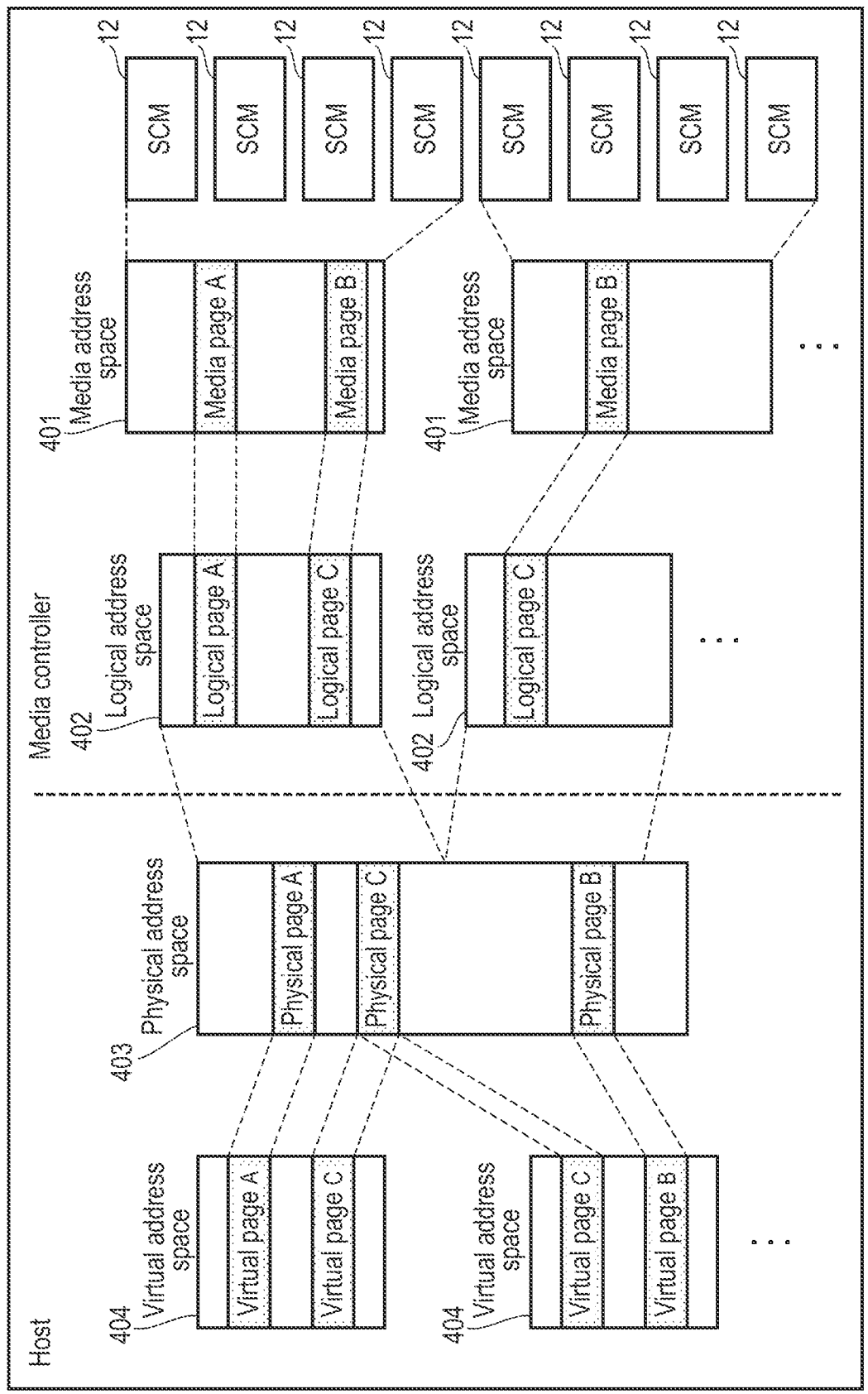
F I G. 3

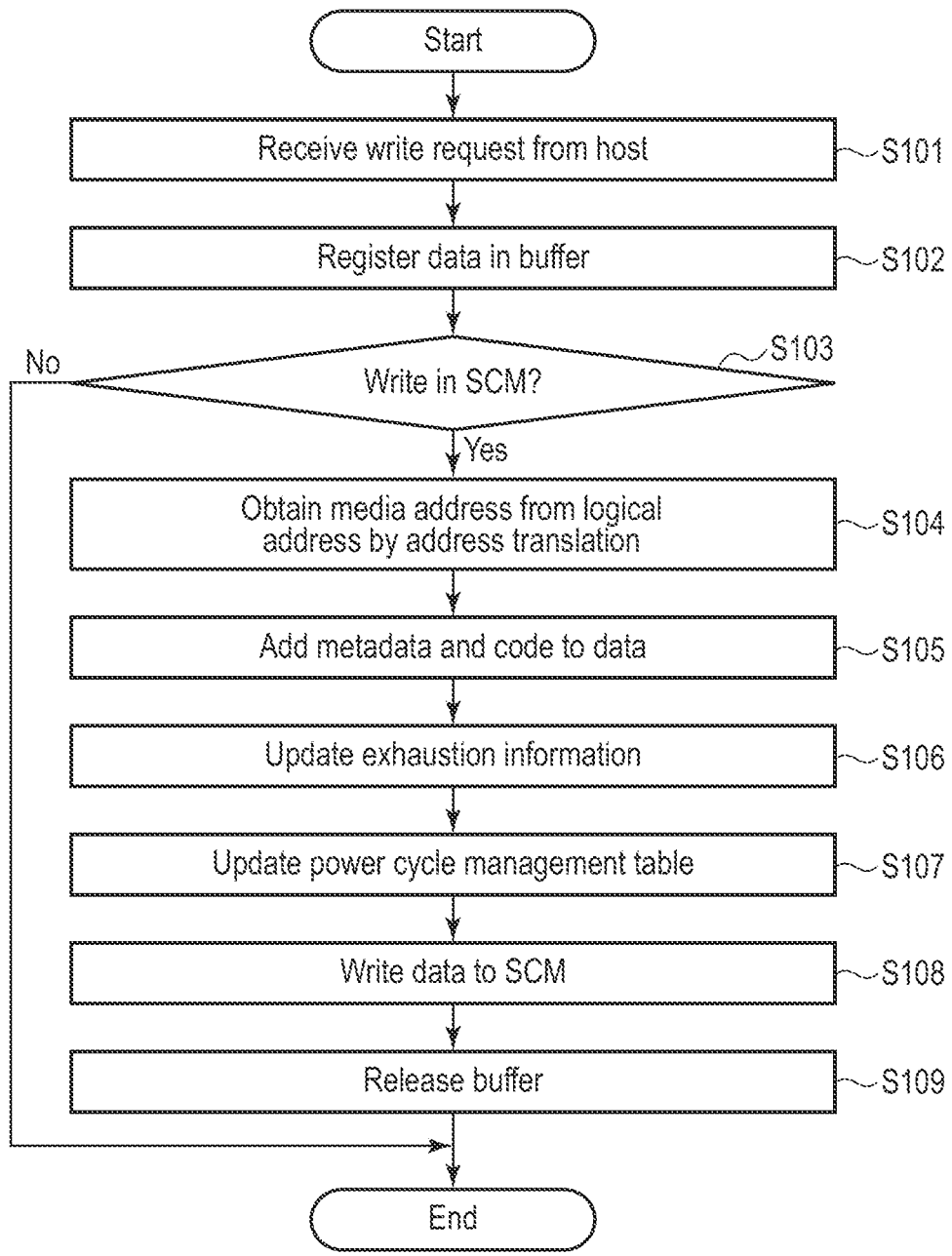
F I G. 7

| Logical address | Media address |
|---|---|
| 0 | 5 |
| 1 | 6 |
| ⋮ | ⋮ |
| N | 188 |

Logical address =0 → Media address =5

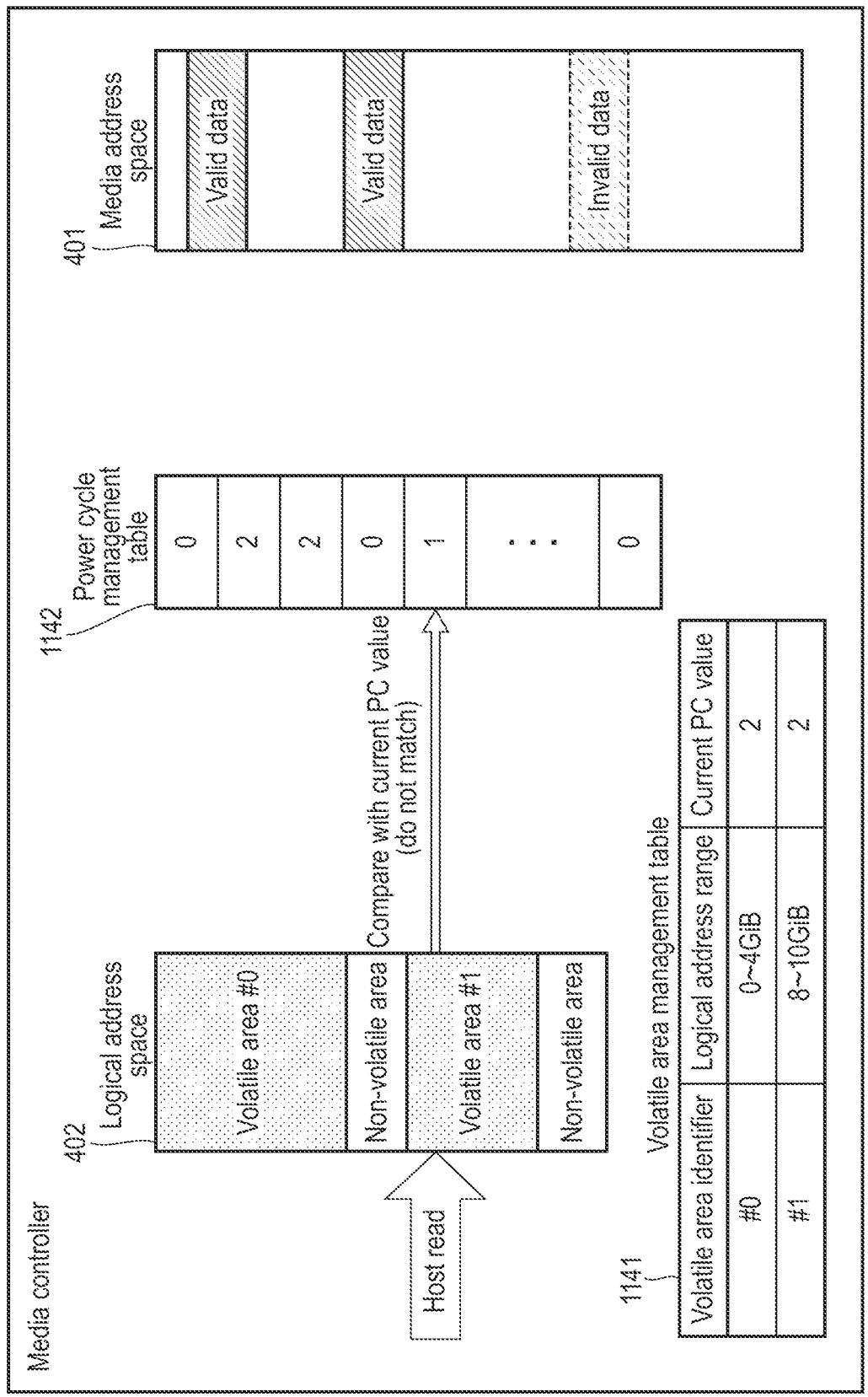
F I G. 12

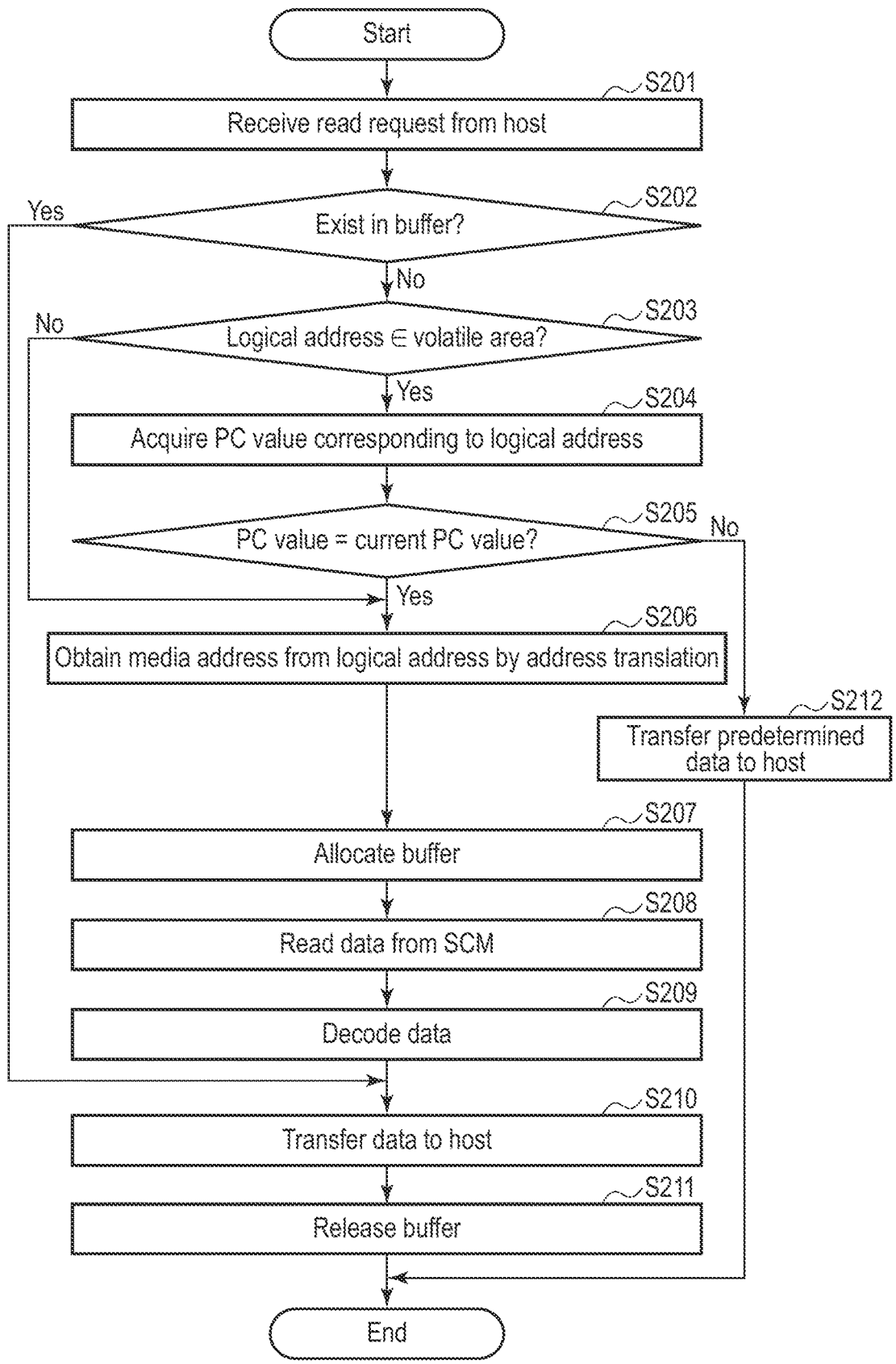
F I G. 14

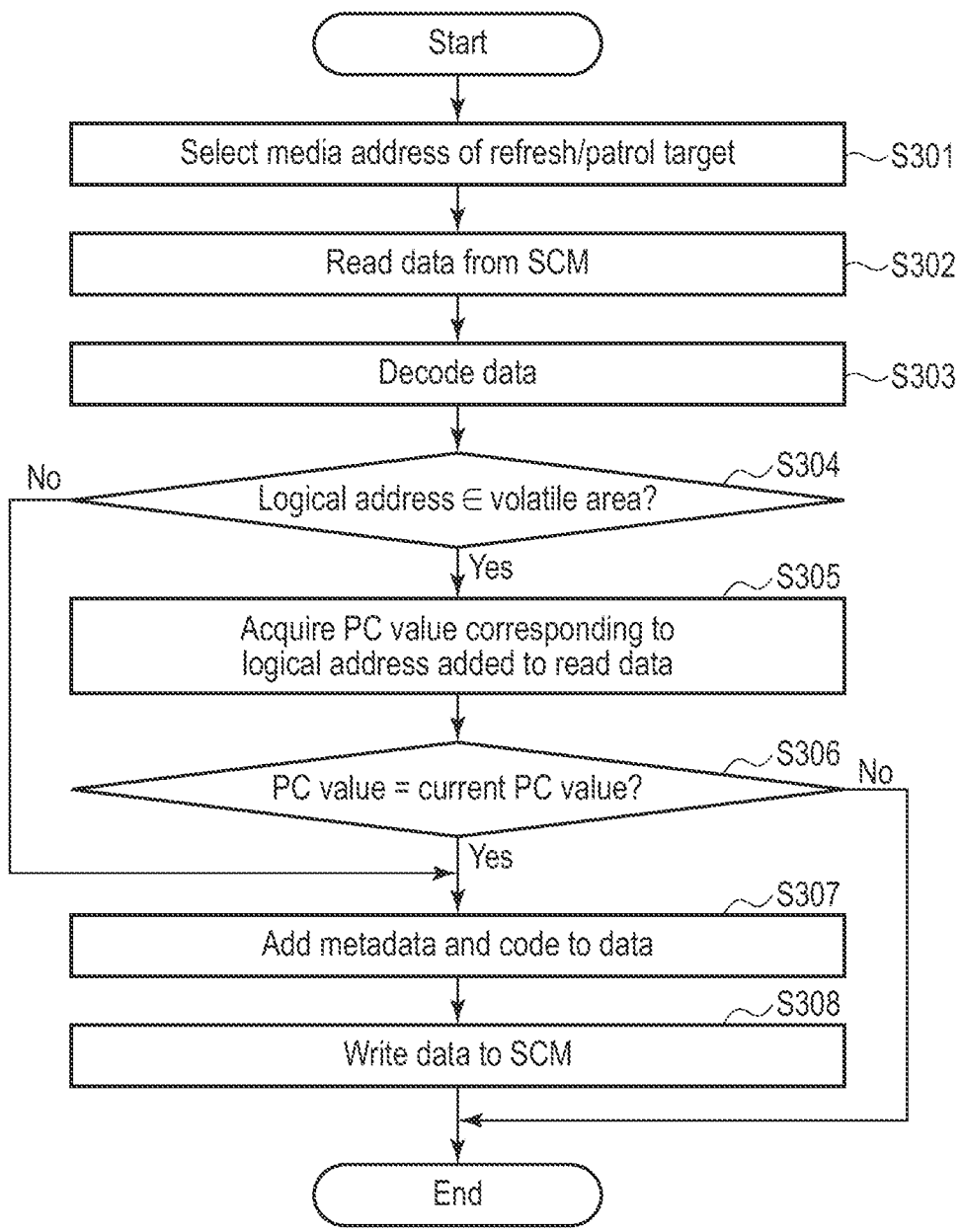
F I G. 16

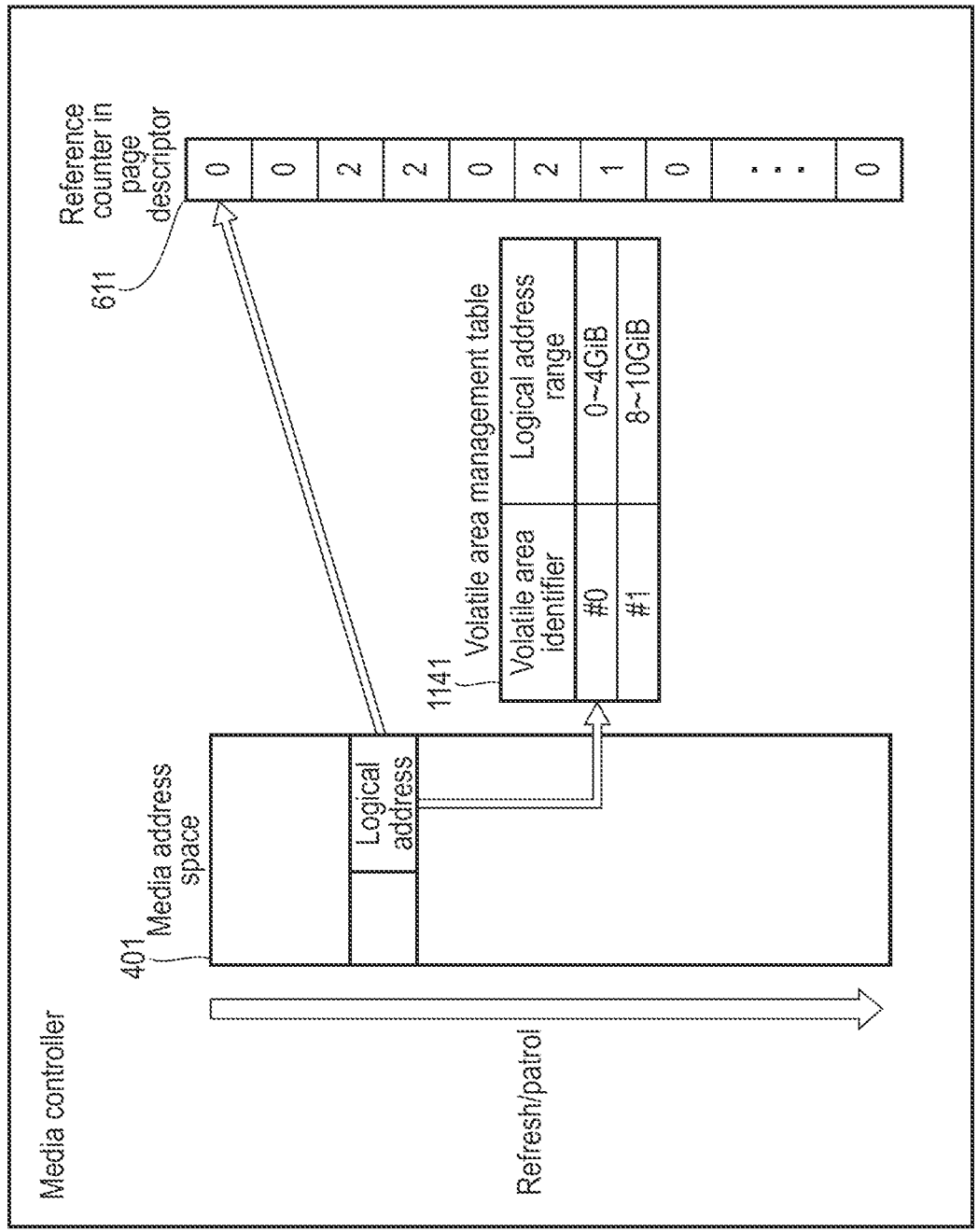
F I G. 20

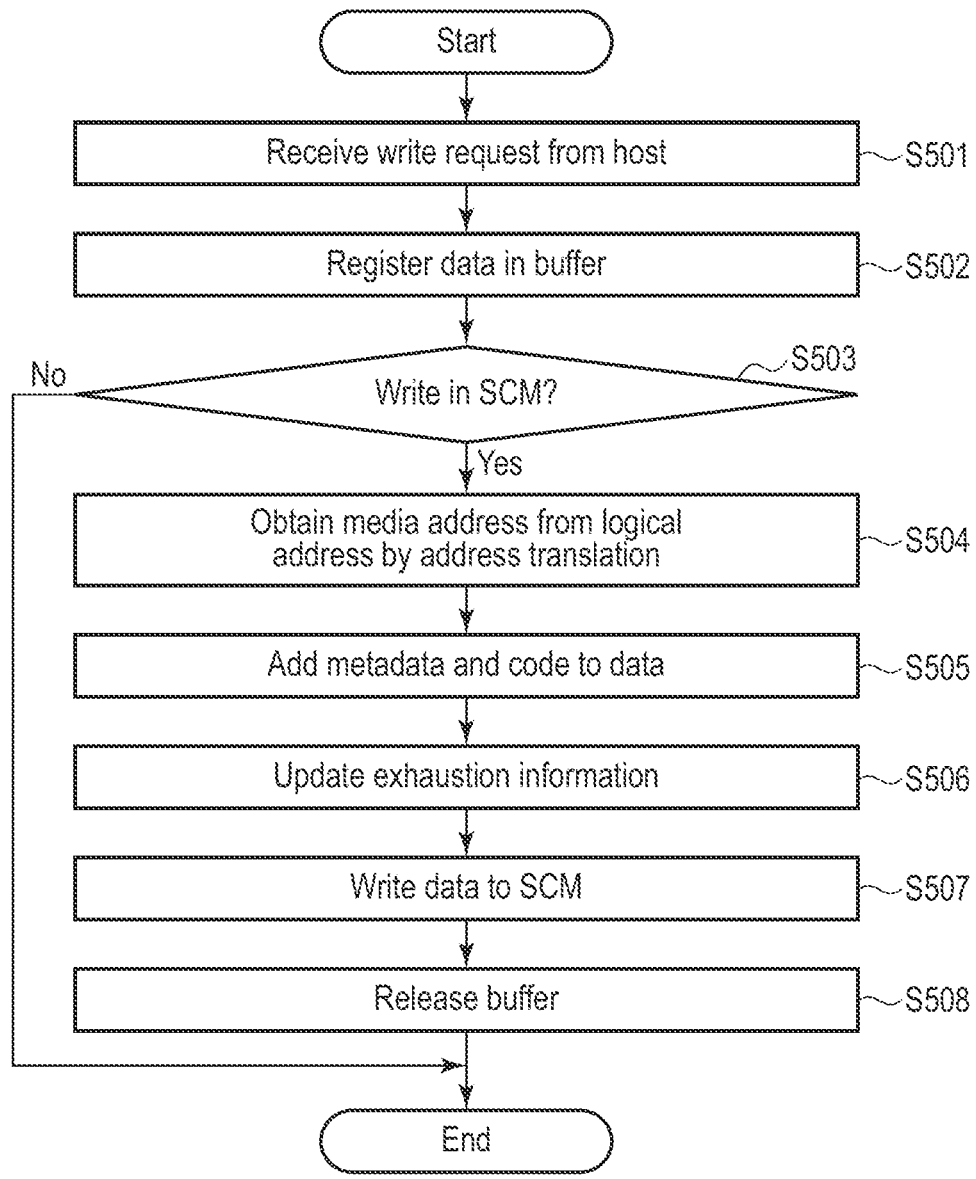
F I G. 21

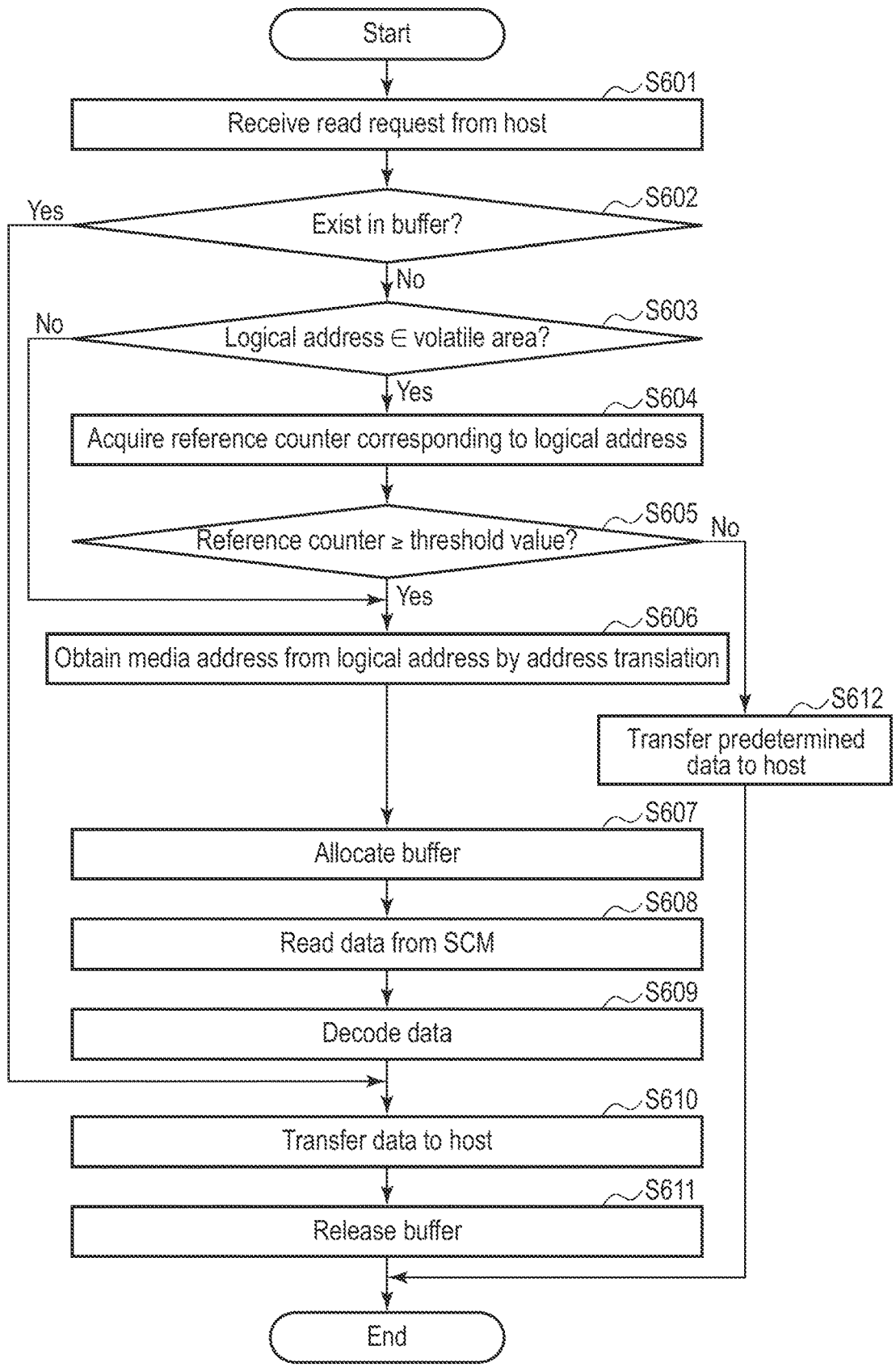
F I G. 22

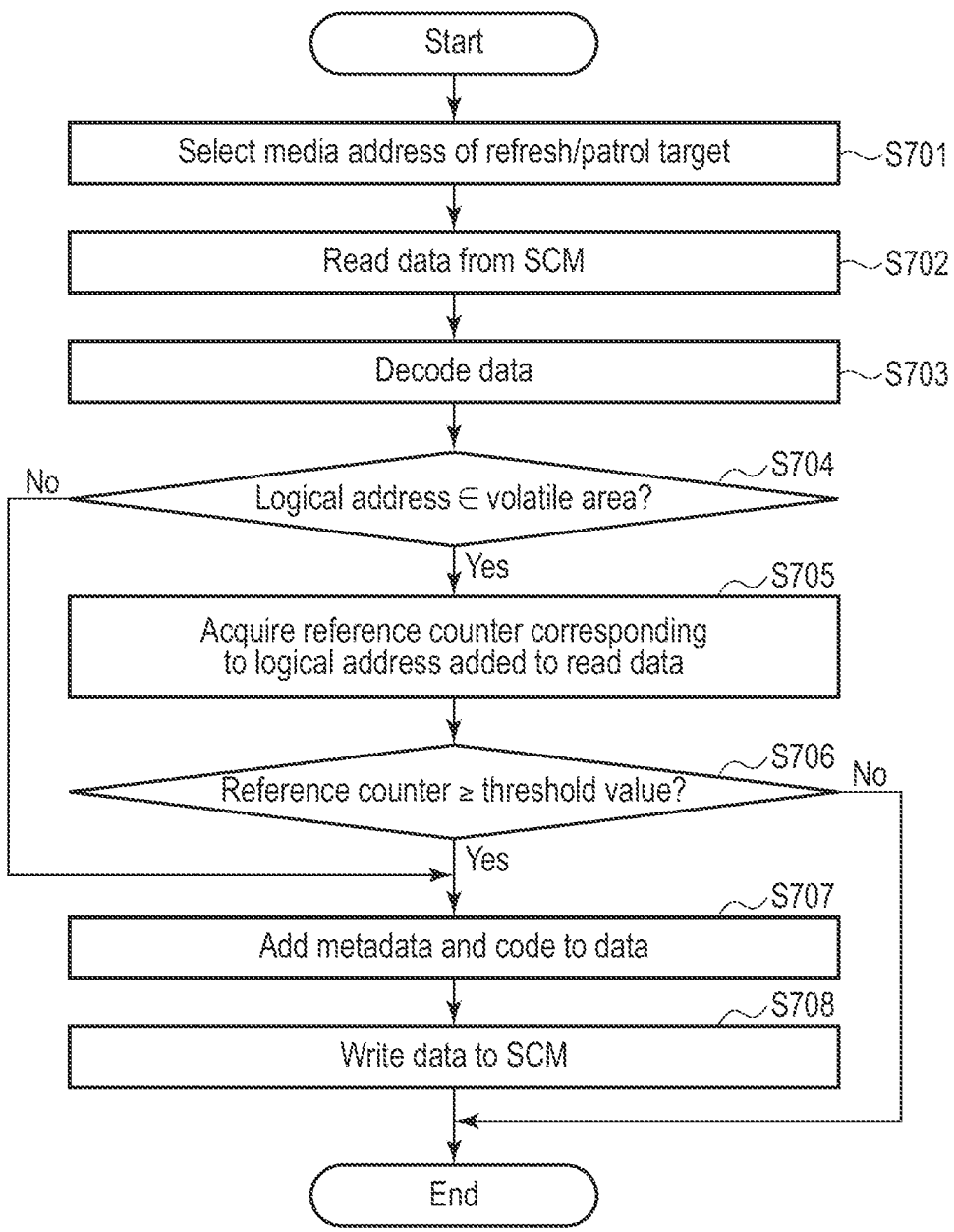
F I G. 23

MEMORY SYSTEM WITH MEMORY AND CONTROLLER

CROSS-REFERENCE TO RELATED APPLICATIONS

This application is based upon and claims the benefit of priority from Japanese Patent Applications No. 2021-110810, filed Jul. 2, 2021, the entire contents of which are incorporated herein by reference.

FIELD

Embodiments described herein relate generally to a memory system.

BACKGROUND

In recent years, a storage class memory (SCM) has been attracting attention as a new layer in the memory hierarchy that bridges the performance gap between main memory (primary storage) and storage (secondary storage). Furthermore, as candidates for SCM, next-generation semiconductor memories such as a resistive random access memory (ReRAM), a phase-change memory (PCM), a magnetoresistive RAM (MRAM), and a ferroelectric RAM (FeRAM) are mentioned.

In an information processing system in which an SCM module (a memory system including an SCM and a controller that controls the SCM) is connected to a host, the host may use a part or the whole of an area of the SCM described above as the main memory. In other words, while the SCM is a non-volatile memory, a part or the whole of the area may be used as a volatile memory by the host. The host may use a part or the whole of the area of the SCM module as the main memory together with a dynamic RAM (DRAM), etc., in a host 2, or may use only a part or the whole of the area of the SCM module as the main memory without the DRAM, etc.

SCMs and SCM modules, which are semiconductor memories, require wear-leveling processing to swap data in order to level out the exhaustion of SCMs, and refresh processing to write back data in order to preserve the data stored in SCMs.

The SCM module cannot detect when an area of the SCM used as volatile memory by the host is released by a process running on the host. This may cause the SCM module to perform wear-leveling processing and refresh processing that are originally unnecessary, based on the recognition that valid data is stored even in areas that have already been volatilized (disappeared) on the host, and where data has become invalid. This may consume the SCM's endurance (the number of times data can be rewritten, or the number of times data can be rewritten and read).

BRIEF DESCRIPTION OF THE DRAWINGS

FIG. 1 shows an example of a configuration of a memory system of a first embodiment.

FIG. 3 shows an example of a relationship between each address space set in an information processing system to which the memory system of the first embodiment is applied.

FIG. 7 is a flowchart showing a write processing procedure executed by the memory system of the first embodiment.

FIG. 12 explains an operation of a case in which a host requests to read data from an invalid data area in a volatile area on the logical address space in the memory system of the first embodiment.

FIG. 14 is a flowchart showing a read processing procedure executed by the memory system of the first embodiment.

FIG. 16 is a flowchart showing a refresh/patrol processing procedure executed by the memory system of the first embodiment.

FIG. 20 explains a mechanism by which the memory system of the second embodiment omits parts of refresh processing that are originally unnecessary.

FIG. 21 is a flowchart showing a write processing procedure executed by the memory system of the second embodiment.

FIG. 22 is a flowchart showing a read processing procedure executed by the memory system of the second embodiment.

FIG. 23 is a flowchart showing a refresh/patrol processing procedure executed by the memory system of the second embodiment.

DETAILED DESCRIPTION

Figure 2:
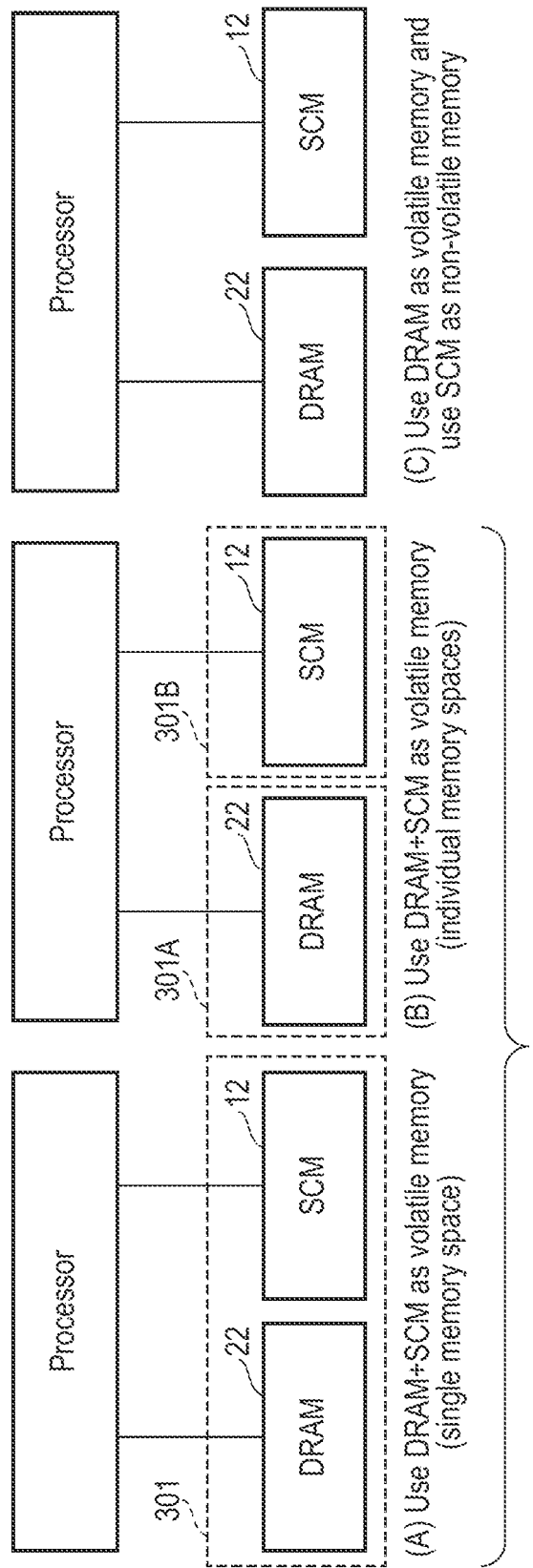
FIG. 2 shows a usage pattern assumed in the memory system of the first embodiment.

Embodiments will be described hereinafter with reference to the accompanying drawings.

In general, according to one embodiment, a memory system includes a non-volatile memory and a controller. The controller controls writing of data to the non-volatile memory or reading of data from the non-volatile memory in response to a command from a host. The controller manages a first area and a second area in a memory space provided to the host, to which an area of the non-volatile memory is mapped. The first area is an area used by the host as a main memory. The second area is an area where valid data is stored.

First Embodiment

First, a first embodiment will be explained.

FIG. 1 shows an example of a configuration of a memory system 1 of the first embodiment. FIG. 1 also shows an example of a configuration of a host 2 (related to the memory system 1) to which the memory system 1 is connected. In other words, FIG. 1 shows an example of an information processing system that includes the memory system 1 and the host 2. The memory system 1 and the host 2 are connected by an interface that complies with, for example, a compute express link (CXL) specification. The CXL is an interface standard that provides a function to maintain cache coherency between a host (in this case, the host 2) and a device (in this case, the memory system 1).

The memory system 1 includes a media controller 11 and one or more non-volatile memories 12. Here, in the memory system 1, the non-volatile memories 12 are assumed to be realized as SCM modules, which are SCMs. ReRAM, PCM, MRAM, FeRAM, etc., can be applied as SCMs. The media controller 11 is realized, for example, as a system-on-chip (SoC).

The media controller 11 communicates with the host 2 by a protocol defined, for example, in a CXL standard. Furthermore, the media controller 11 that communicates with the host 2 controls a non-volatile memory 12 in response to commands from the host. Specifically, in a case where the media controller 11 receives a write command from the host, it executes write processing to write data to the non-volatile memory 12. In addition, in a case where the media controller 11 receives a read command from the host, it executes read processing to read data from the non-volatile memory 12.

The media controller 11 spontaneously executes write processing and read processing at a predetermined timing, regardless of the command from the host 2. For example, the media controller 11 executes the write processing and the read processing as part of wear-leveling processing that swaps data to level out the exhaustion of the non-volatile memory 12 and refresh processing that writes back data to preserve the data stored in the non-volatile memory 12.

The media controller 11 includes an address translator 111, a refresh/patrol controller 112, a wear-leveling controller 113, and a valid data area manager 114. Each unit in the media controller 11 may be realized by hardware, such as an electric circuit, or by a processor (not shown) in the media controller 11 executing software (program).

The address translator 111 manages the correspondence between a logical address used by the host 2 to logically specify a location in the memory space provided by the memory system 1 and a media address indicating a physical location on the non-volatile memory 12 in the memory system 1. The address translator 111 includes an address translation table 1111 for managing the correspondence between logical addresses and media addresses. The address translation table 1111 is created, for example, on the SCM 12. The address translator 111, for example, caches a part or the whole of the address translation table 1111 in a RAM (not shown) in the media controller 11 or in an external RAM (not shown) connected to the media controller 11, and uses the address translation table 1111 to execute the translation from logical addresses to media addresses.

The refresh/patrol controller 112 controls the refresh processing. The refresh/patrol controller 112, for example, cyclically monitors (patrol processing) an area of one or more non-volatile memories 12, and determines areas where the elapsed time since the last data access (writing or reading of data) has exceeded a threshold value, areas where data accesses have been frequently performed, or areas in the vicinity of such areas to be areas subject to refresh processing. The refresh/patrol controller 112 reads the data stored in the area to be refreshed and writes the read data back to the non-volatile memory 12 (refresh processing). The destination of the data to be written back in the refresh processing may be the same area as that from which the data was read, or a different area from that from which the data was read. The method of determining whether or not the area should be a refresh target is not limited to a specific method, and various known methods can be applied.

The wear-leveling controller 113 controls the wear-leveling processing. The wear-leveling controller 113 swaps the stored data between areas with a high level of exhaustion and areas with a low level of exhaustion in one or more non-volatile memories 12. Here, areas with a large number of data rewrites or a large number of data rewrites and data reads are assumed to be areas with a high level of exhaustion. Therefore, areas with a low level of exhaustion are areas where the number of data rewrites or the number of data rewrites and data reads is small. The wear-leveling controller 113 reads data from both the area with a high level of exhaustion and the area with a low level of exhaustion, swaps write destinations, and writes the respective data back to the non-volatile memory 12. With the wear-leveling processing, the correspondence between logical addresses and media addresses managed by the address translator 111 is updated. The method of selecting the area for wear-leveling is not limited to a specific method, and various known methods can be applied.

The valid data area manager 114 manages an area that is used by the host 2 as volatile memory (volatile area) in the memory space provided by the memory system 1. The valid data area manager 114 also manages an area where valid data is stored on the non-volatile memory 12 (valid data area). The valid data area manager 114 includes a volatile area management table 1141 for managing the volatile area and a power cycle management table 1142 for managing the valid data area or, more specifically, for determining whether the data on the volatile area is valid or not. The volatile area management table 1141 and the power cycle management table 1142 are created, for example, on the SCM 12. The valid data area manager 114, for example, caches a part or the whole of the volatile area management table 1141 and the power cycle management table 1142 in a RAM in the media controller 11 or an external RAM connected to the media controller 11, and uses the volatile area management table 1141 and the power cycle management table 1142. The volatile area management table 1141 and the power cycle management table 1142 will be described later.

The host 2 includes a processor (CPU) 21 and a DRAM 22. The processor 21 executes an operating system (OS) 201 and a process (application program) 202 that operates under the control of the OS 201. In addition to the area on the DRAM 22, the OS 201 can recognize a part or the whole of the memory space provided by the memory system 1 as an area for the main memory. In other words, the host 2 can use a part of the memory space provided by the memory system 1 as volatile memory. The OS 201 can also recognize a part or the whole of the memory space provided by the memory system 1 as an area for the main memory.

The process 202 operating under the control of the OS 201 may be a program for constructing one or more virtual machines (VMs). On each VM, a guest OS 201' and a process 202' operate. In comparison to the guest OS 201' operating on each VM, the OS 201 is referred to as a host OS 201.

FIG. 2 shows an example of forms in which the memory system 1 is used by the host 2.

FIG. 2, part (A) shows a form in which an area of the DRAM 22 of the host 2 and a part of the memory space provided by the memory system 1, specifically, a part of the area of the non-volatile memory (SCM) 12, form a single memory space 301 within the host 2 and are used as the main memory.

FIG. 2, part (B) shows a form in which an area of the DRAM 22 of the host 2 and a part of the memory space provided by the memory system 1, specifically, a part of the area of the SCM 12, form individual memory spaces (301A and 301B) in the host 2, respectively, and both are used as the main memory.

FIG. 2, part (C) shows a form in which only an area of the DRAM 22 of host 2 is used as the main memory, and the entire memory space provided by the memory system 1 is used as a storage.

In the first embodiment, it is assumed that the memory system 1 is used in the form of FIG. 2, part (A) or (B). In other words, a form in which a part of the area of the SCM 12 is used as the main memory by the host 2 is assumed.

Even in an environment where the memory system 1 is connected to multiple hosts 2 and the usage patterns of FIG. 2, parts (A) to (C) are mixed, the control method of omitting parts of the originally unnecessary wear-leveling processing and refresh processing described below can be applied to the area of the SCM 12 used as the main memory by the host 2.

FIG. 3 shows an example of the relationship between each address space set for the host 2 to perform data access to the memory space provided by the memory system 1 in an information processing system including the memory system 1 and the host 2.

As shown in FIG. 3, in an information processing system that adopts a memory system 1 equipped with one or more non-volatile memories (SCMs) 12, four address spaces such as a media address space 401, a logical address space 402, a physical address space 403, and a virtual address space 404 are configured.

The media address space 401 is an address space that is accessed when the media controller 11 performs read/write to the SCM 12. A media address is an address that is associated with a physical entity such as a memory cell of the SCM12. The media address is an address in bytes and is represented by a media page number of a media page, which is the smallest unit of access by the media controller 11 to the SCM 12, and an offset in the media page. The size of the media page is, for example, 128 bytes or 256 bytes. The media page may be configured by bits from a single SCM12 or from multiple SCM12s. In other words, there are no particular restrictions on the physical structure of the media page.

The logical address space 402 is an address space provided by the media controller 11 to the OS 201 of the host 2. The logical address is an address in bytes, and is an address assigned to the memory space provided by the memory system 1 to the host 2. When the host 2 accesses the memory system 1, it specifies the logical address and accesses it in units of cache line size (e.g., 64 bytes). In FIG. 3, the area on the logical address space corresponding to a physical page described below is illustrated as a logical page. The logical page in the logical address space 402 and the media page in the media address space 401 may be different in size. More specifically, the size of the logical page may be a positive integer multiple (two or more) of the size of the media page. The mapping of the media address space 401 to the logical address space 402 may be such that the media pages of the media address space 401 are associated on the logical address space 402 differently than they are arranged on the media address space 401 (interleaving).

The physical address space 403 is the address space managed by the OS 201 of the host 2 and to which the logical address space 402 provided by the media controller 11 is mapped. In other words, a physical address is an address assigned by the OS 201 to the memory space provided by the media controller 11. The physical address space 403 is managed by each predetermined size called a physical page. The physical address is represented by a physical page number assigned to each of these physical pages and an offset in the physical page. The mapping of the logical address space 402 to the physical address space 403 may also be interleaved.

The virtual address space 404 is an address space established for each process 202 or VM. The virtual address space 404 is constructed by the OS 201, which controls the allocation of resources. On the virtual address space 404, a virtual page is formed to which physical pages of the physical address space 403 are associated. A virtual address is represented by a virtual page number of this virtual page and an offset in the virtual page. In other words, the virtual address is an address used by the process 202 or VM to access the memory system 1. As shown in FIG. 3, in some cases, one physical page of the physical address space 403 may be associated with virtual pages of multiple virtual address spaces 404. By associating the virtual page and the physical page in this manner, for example, data written by a certain process 202 or VM on the memory system 1 can be read from the memory system 1 by another certain process 202 or VM.

Figure 4:
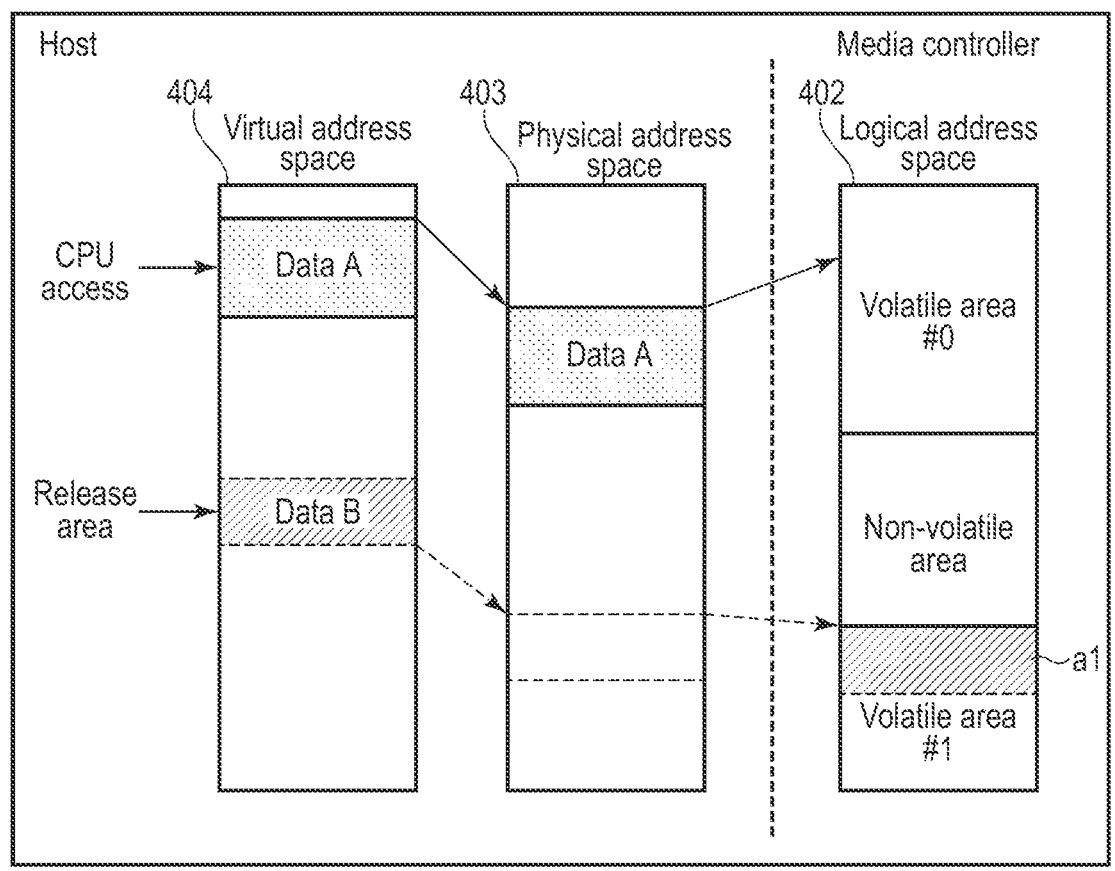
FIG. 4 explains problems that may occur in a case where a host uses a part of a non-volatile memory area provided in the memory system of the first embodiment as a volatile area.

Now, with reference to FIG. 4, problems that arise in a case where the host 2 uses a part of the memory space provided by the memory system 1 as a volatile area.

When setting a system configuration (main memory configuration) of an information processing system, the OS 201 or process 202 can notify the memory system 1 that a part or the whole of the area on the memory space provided by the memory system 1 is to be used as a volatile area, for example, by issuing a management command to the memory system 1. A plurality of volatile areas can be provided on the logical address space 402. Alternatively, the media controller 11 may provide a separate logical address space 402 for each volatile area to the OS 201 based on the notification from the OS 201 or process 202.

The OS 201 or the process 202 issues a management command that includes, for example, a physical address indicating the location of the beginning of the volatile area on the physical address space 403 to which the logical address space 402 is mapped and the size of the volatile area as parameters. In the case of providing multiple volatile areas on the logical address space 402, the OS 201 or process 202 issues a management command for each volatile area. The management command issued by the process 202 may include, as a parameter, a virtual address indicating a location on the virtual address space 404 provided for the process 202. In this case, the OS 201 that relays the management command issued by the process 202 translates the virtual address into a physical address.

The valid data area manager 114 of the memory system 1 (media controller 11) sets the volatile area on the logical address space 402 in response to the management command from the host 2. Specifically, it manages the information (logical address range) of the area to be used as the volatile area on the logical address space 402. The translation between the physical address of the physical address space 403 and the logical address of the logical address space 402 is executed by the OS 201 of the host 2. The setting of the volatile area on the logical address space 402 remains unchanged unless the system configuration (configuration of the main memory) of the information processing system is changed. In the case where the system configuration of the information processing system is changed, a management command is sent from the host 2 again.

FIG. 4 shows an example in which two volatile areas (#0, #1) are provided on the logical address space 402. Here, it is assumed that data A is stored in volatile area #0 and data B is stored in volatile area #1. It is also assumed that the process 202 or VM no longer needs data B on the main memory and has released the area allocated on the main memory for storing data B. The timing when the data stored in the volatile area on the logical address space 402 is no longer needed is when the process 202 or VM explicitly releases the area, when the process 202 or VM terminates, when the OS 201 is restarted, etc.

For example, in a solid state drive (SSD), there is a means for the host 2 to notify the area where data is no longer needed, such as the trim command. On the other hand, in the SCM module, there is no established means for the host 2 to notify the area where data is no longer needed relating to the area used as the main memory.

Therefore, the media controller 11 of the memory system 1 still recognizes data B stored in area a1 in volatile area #1 on the logical address space 402, which the host 2 has discarded from the memory system, as valid data. Similarly, for example, when the OS 201 is restarted, the data in the main memory is once volatilized (disappears), but if no measures are taken, the media controller 11 will recognize the invalid data stored in the volatile areas (#0, #1) in the logical address space 402 that have not been written by the host 2 after the initialization of the main memory as valid data. Therefore, there is a possibility that the media controller 11 will perform unnecessary refresh processing and wear-leveling processing in the invalid data area based on the recognition that valid data is stored therein. This may consume the endurance (number of times data can be rewritten) of the SCM 12.

The above are the problems that may arise in the case where the host 2 uses a part or the whole of the memory space provided by the memory system 1 as a volatile area.

Now, with reference to FIG. 5, an overview of a control method executed by the memory system 1 of the first embodiment for omitting parts of the wear-leveling processing and refresh processing that are originally unnecessary will be described.

As described above, in the case where the host 2 uses a part or the whole on the memory space provided by memory system 1 as a volatile area, the OS 201 or the process 202 notifies the logical address range to be used as a volatile area, for example, by issuing a management command. Based on this notification, the valid data area manager 114 of the memory system 1 (media controller 11) manages the information (logical address range) of the area to be used as the volatile area on the logical address space 402 using the volatile area management table 1141. In a case where a different logical address space 402 is provided for each volatile area, one volatile area management table 1141 is provided for each logical address space 402. In this case, the number of entries in each volatile area management table 1141 is one.

In addition, the valid data area manager 114 manages, for example, for each unit of the size of a logical page of the logical address space 402, written area management information 500 indicating whether or not writing has been performed by the host 2 after the initialization of the main memory. For example, "0" indicates that no writing by the host 2 has been performed, and "1" indicates that writing by the host 2 has been performed.

The media controller 11 manages the data stored in the area on the logical address space 402 that is used as a non-volatile area by the host 2, other than the logical address range managed by the volatile area management table 1141, as valid data. In addition, in an area on the logical address space 402 used as a volatile area by the host 2, the media controller 11 manages data in an area where the written area management information 500 indicates as being written by the host, as valid data.

In other words, among the areas on the logical address space 402 used as the volatile area by the host 2, the media controller 11 manages the areas that have been written by the host 2 after initialization of the volatile area as valid data areas, and manages the areas that have not been written by the host 2 as invalid data areas. The refresh/patrol controller 112 and the wear-leveling controller 113 omit writing back the data in the invalid data area to the SCM 12.

Figure 5:
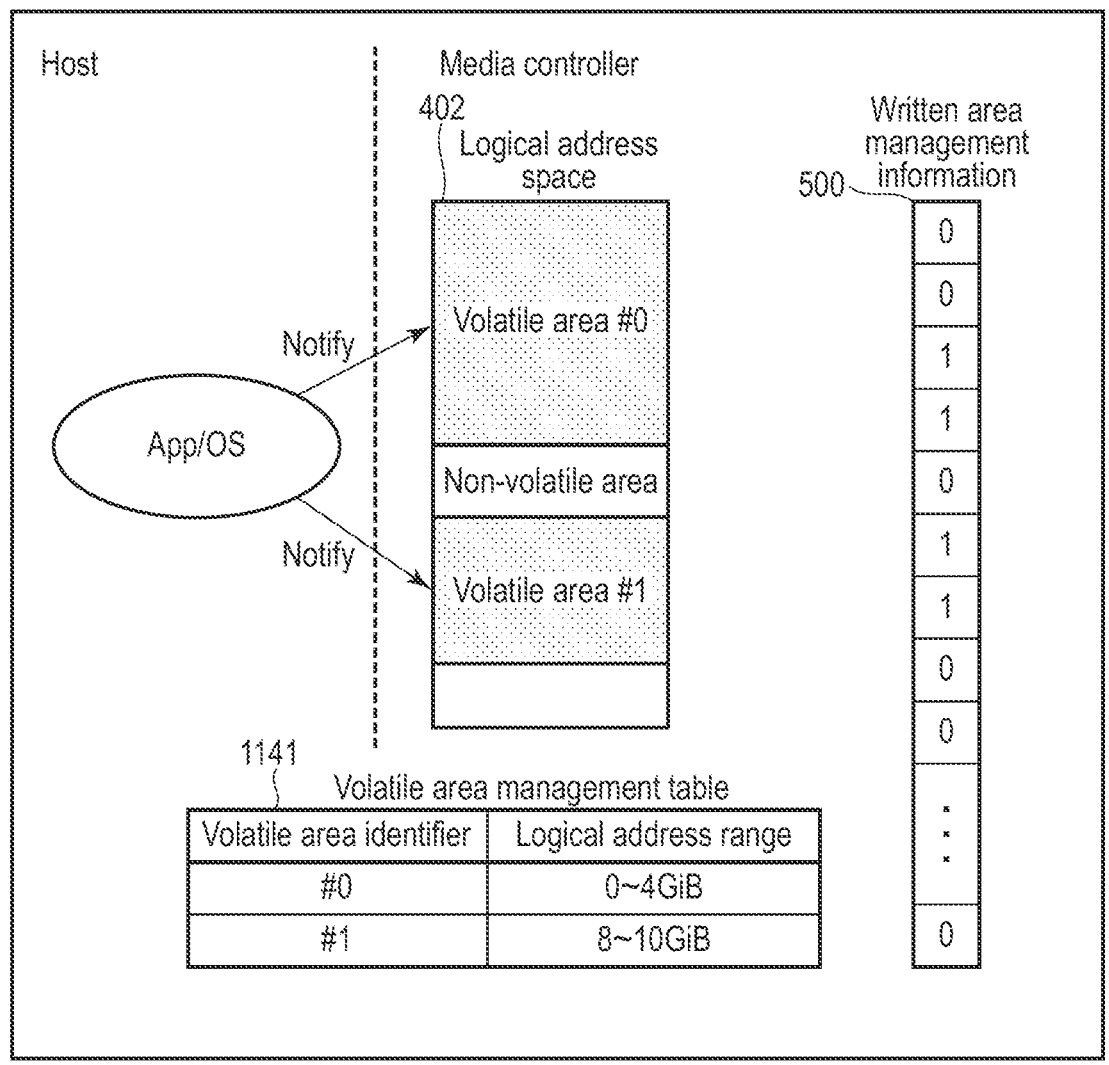
FIG. 5 explains an overview of a control method executed by the memory system of the first embodiment for omitting parts of wear-leveling processing and refresh processing that are originally unnecessary.

In FIG. 5, for the sake of clarity of explanation, the written area management information 500 which indicates by "0" or "1" whether or not writing has been performed by the host 2 after initialization of the main memory is shown, and the media controller 11 of the first embodiment uses the power cycle management table 1142 of the valid data area manager 114 to derive the above "0" or "1". The power cycle management table 1142 is a table that manages the current PC (power cycle) value of the volatile area on the logical address space 402. The PC value is, for example, a value that is incremented each time the host 2 is booted, or more particularly, each time the OS 201 is booted. Alternatively, in a case where one or more VMs are built on the host 2 and the OS 201 allocates volatile areas on the logical address space 402 to each of the one or more VMs individually, at the time of termination of the VM, the OS 201 issues a release request to the memory system 1 for the volatile area allocated to the VM, and based on this release request, the PC value of that volatile area may be incremented.

Figure 6:
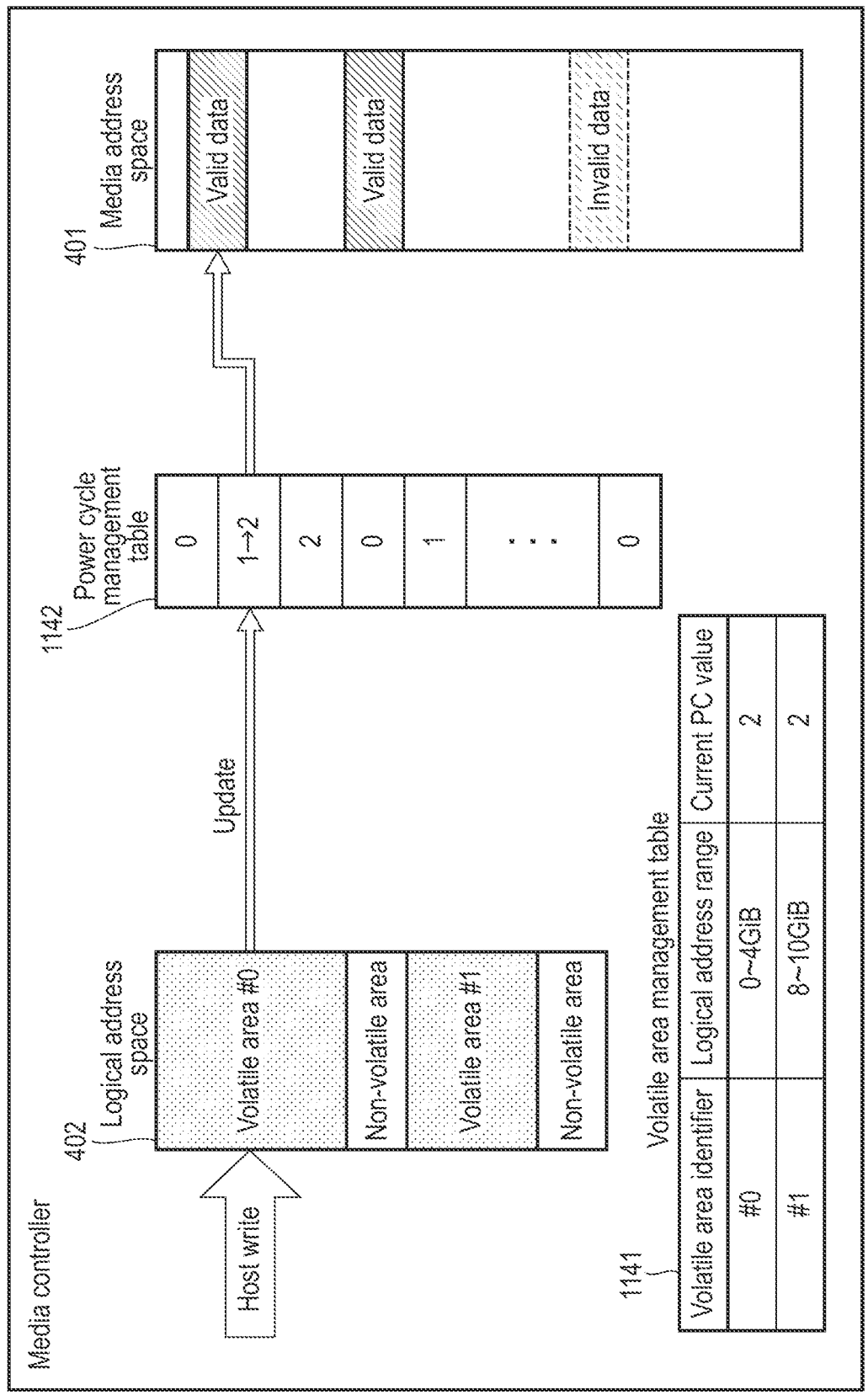
FIG. 6 shows an example of an update of a power cycle management table used in the memory system of the first embodiment.

FIG. 6 shows an example of an update of the power cycle management table 1142 performed in a case where the host 2 writes data to a volatile area on the logical address space 402.

In the memory system 1 of the first embodiment, the valid data area manager 114 manages the current PC value of the volatile area together with the logical address range by use of the volatile area management table 1141. The current PC value represents the current PC value, and the PC value is a value that is incremented, for example, each time the host 2 is booted, or more particularly, each time the OS 201 is booted, as described above. Alternatively, in the case where one or more VMs are built on the host 2 and the OS 201 allocates volatile areas on the logical address space 402 to each of the one or more VMs individually, at the time of termination of the VM, the OS 201 issues a release request to the memory system 1 for the volatile area allocated to the VM, and based on this release request, the PC value of that volatile area may be incremented. In FIG. 6, "2" is held as the current PC value for volatile areas #0 and #1, respectively.

Here, a case in which data is written by the host 2 to one of the areas in volatile area #0 on the logical address space 402 is assumed. At this time, the valid data area manager 114 checks whether or not the value of the entry in the power cycle management table 1142 corresponding to the area matches the current PC value in the volatile area management table 1141. If it does not match, the valid data area manager 114 updates the value of the entry to the current PC value. The valid data area manager 114 may also omit the process of checking whether the value of the entry matches the current PC value, and update the value of the entry to the current PC value each time. The area in which the value in the power cycle management table 1142 matches the current PC value in the volatile area management table 1141 is a valid data area that stores data written after the initialization of the volatile area. On the other hand, the area in which the value in the power cycle management table 1142 does not match the current PC value in the volatile area management table 1141 is an invalid data area that stores unnecessary data from the past.

FIG. 7 is a flowchart showing a write processing procedure executed by the memory system 1 (media controller 11) of the first embodiment.

The media controller 11 receives a write request from the host 2 (S101). The write request includes a logical address of a write destination and data. The media controller 11 registers the data received from the host 2 into a buffer (S102). The buffer may, for example, be provided on Static RAM (SRAM) in the media controller 11, or on DRAM connected to the media controller 11. If data corresponding to the same logical address (logical address received from the host 2) has already been registered in the buffer, the media controller 11 overwrites the data on the buffer.

Figures 8, 9:
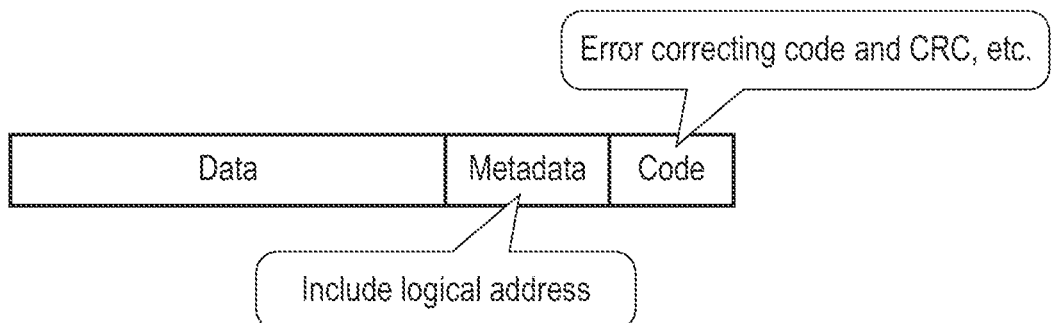
FIG. 8 shows an example of address translation using an address translation table of the memory system of the first embodiment.
FIG. 9 shows an example of adding metadata and a code to data to be written in the memory system of the first embodiment.

For example, in the case where the buffer is full of data, the media controller 11 writes the oldest data on the buffer to the SCM 12. A so-called eviction algorithm to evict data from the buffer is not limited to Least Recently Used (LRU), and various algorithms can be applied, such as Least Frequently Used (LFU). In the case where the media controller 11 writes data to the SCM 12 (S103: Yes), the media controller 11 obtains a media address from the logical address of the write destination by address translation using the address translator 111 (S104). FIG. 8 shows an example of address translation by the address translator 111 using the address translation table 1111.

In FIG. 8, the logical address "0" is associated with the media address "5" in the address translation table 1111. By referring to this address translation table 1111, the address translator 111 can obtain the media address "5" that is associated with the logical address "0". The address translator 111 can also obtain the logical address "0" from the media address "5" by referring to the address translation table 1111.

Instead of translating a logical address to a media address using the address translation table 1111, the address translator 111 may translate a logical address to a media address by arithmetic operation using a translation formula. For example, the media address may be obtained from the logical address and exhaustion information. In this case, a function to translate a logical address to a media address may be provided with the logical address and exhaustion information as arguments.

In addition, the media controller 11 adds metadata and a code to the data to be written (S105). FIG. 9 shows an example of adding metadata and a code to data. The metadata includes a logical address. The code is an error correcting code (ECC), cyclic redundancy code (CRC), etc. Instead of including the logical address in the metadata to be added to the data, the media controller 11 may further comprise a reverse lookup table to translate the media address to the logical address.

The media controller 11 may also perform data randomization (swapping bit positions) or the like in S105.

The media controller 11 updates the exhaustion information of the area (media page) on the media address space 401 indicated by the media address (S106). The exhaustion information is, for example, the number of times data is written. In addition, the media controller 11 updates the PC value stored in the entry corresponding to the logical address on the power cycle management table 1142 to the current PC value stored in the entry corresponding to the relevant volatile area acquired by referring to the volatile area management table 1141 (S107).

After updating the power cycle management table 1142, the media controller 11 writes data to the SCM 12 (S108) and releases the buffer (S109). With the release of the buffer, the media controller 11 ends the write processing. On the other hand, in the case where the buffer is not full of data and no data is to be written to the SCM12 (S103: No), the media controller 11 ends the write processing with the registration of data to the buffer in S102.

Figure 10:
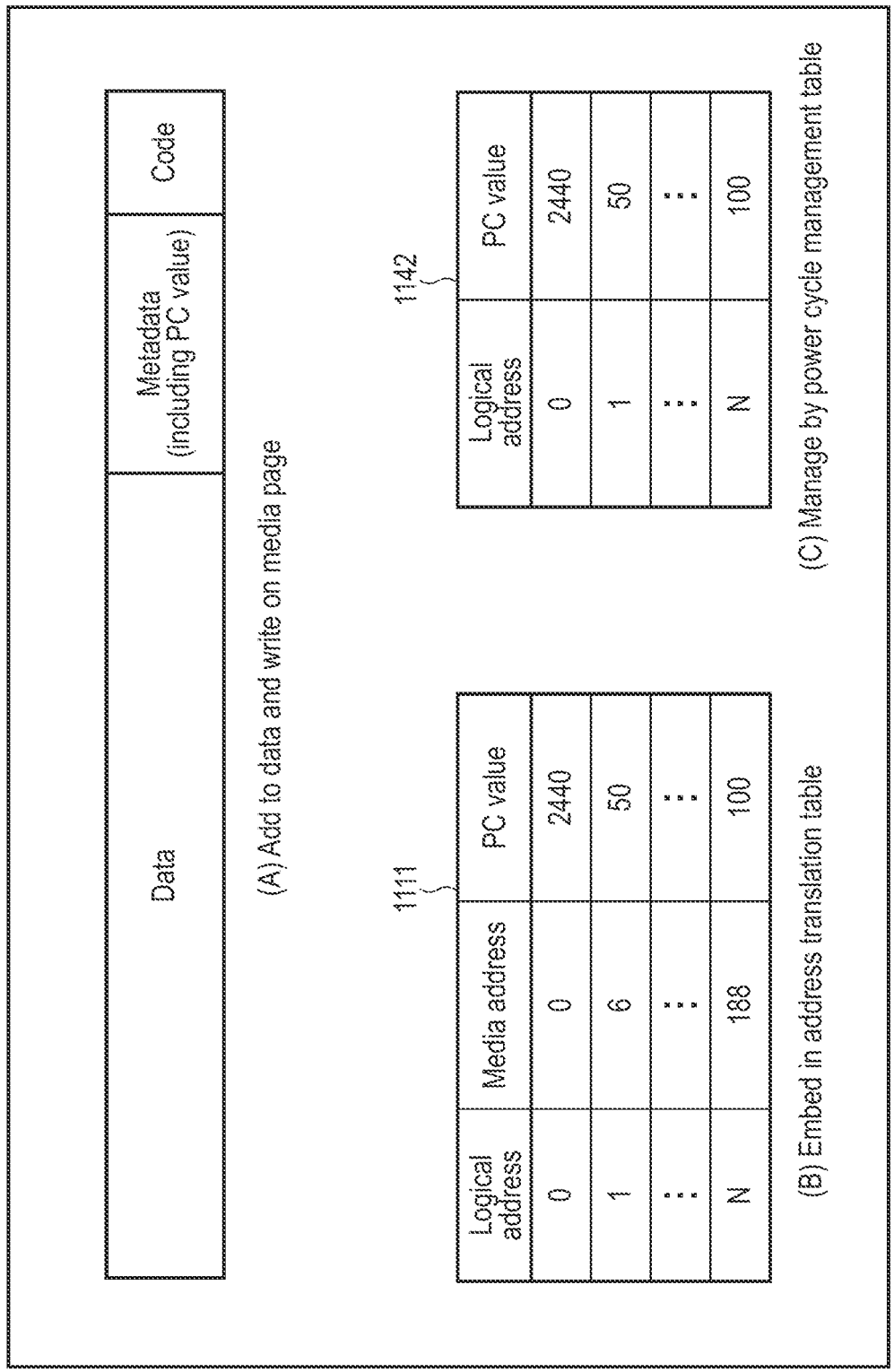
FIG. 10 shows an example of a power cycle management method in the memory system of the first embodiment.

FIG. 10 shows an example of a power cycle management method performed by the valid data area manager 114.

In FIG. 1 and FIG. 6, a power cycle management table 1142 is shown to manage power cycles. However, the valid data area manager 114 is not limited to managing the power cycle with the power cycle management table 1142, and may manage the power cycle by other methods.

For example, FIG. 10, part (A) shows an example of writing a power cycle to a media page by adding it to data. The valid data area manager 114 may, for example, store a PC value (along with the logical address) in the metadata, and add the metadata to the data. In other words, the valid data area manager 114 uses the metadata stored in each media page to manage the power cycle.

FIG. 10, part (B) shows an example of embedding a PC value in the address translation table 1111 of the address translator 111. The valid data area manager 114 works with the address translator 111 to manage the power cycle by the address translation table 1111.

FIG. 10, part (C) shows an example of managing power cycles by the power cycle management table 1142, also shown in FIG. 1 and FIG. 6.

Figure 11:
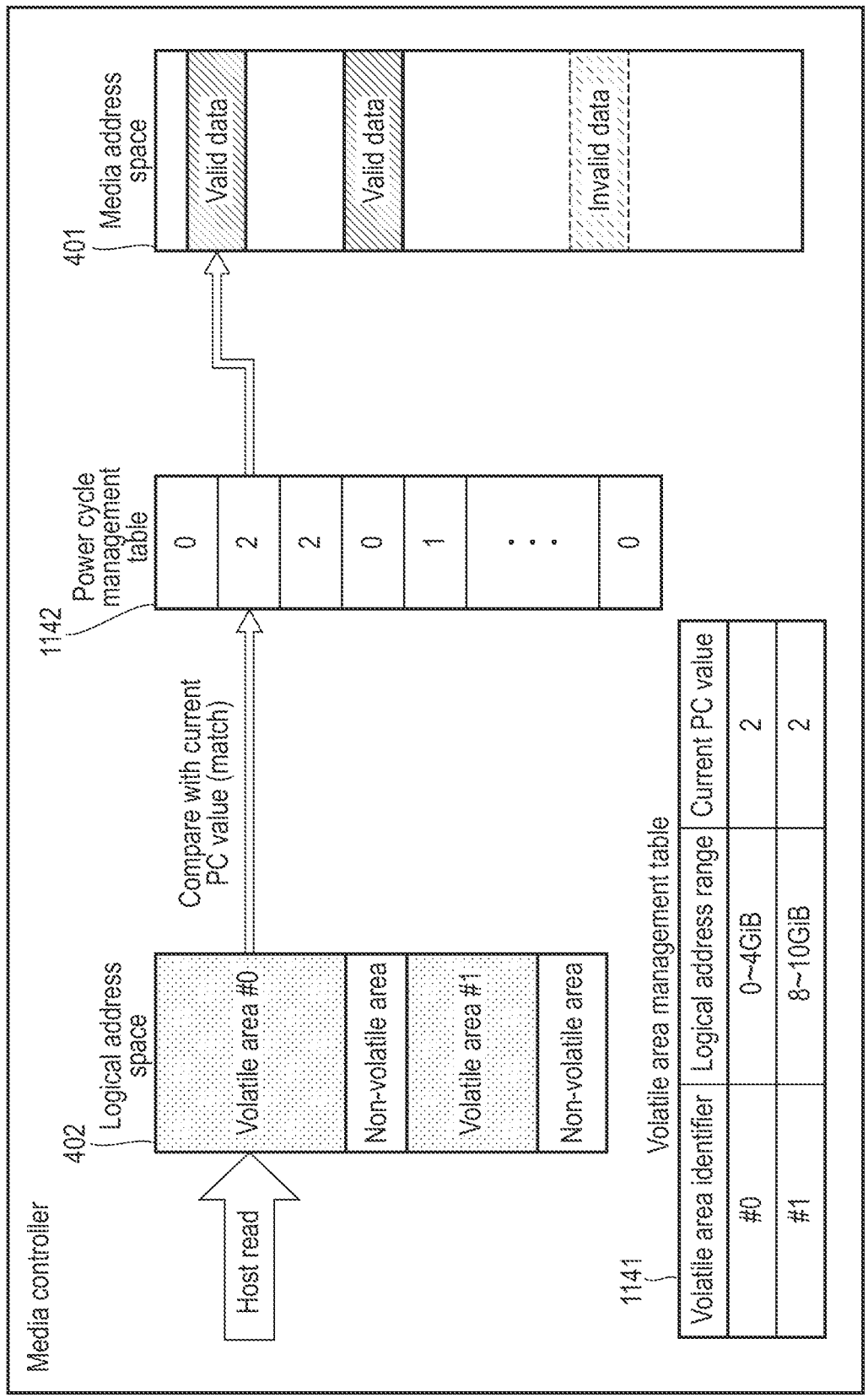
FIG. 11 explains an operation of a case in which a host requests to read data from a valid data area in a volatile area on a logical address space in the memory system of the first embodiment.

FIG. 11 explains an operation of the media controller 11 in a case where the host 2 requests to read data from a valid data area in a volatile area on the logical address space 402.

A case in which the host 2 requests to read data from a volatile area (in this case, volatile area #0) on the logical address space 402 is assumed. The valid data area manager 114 determines whether or not a PC value of an entry in the power cycle management table 1142 corresponding to a logical address specified by the host 2 matches a current PC value of volatile area #0 managed in the volatile area management table 1141. Here, it is assumed that they match at "2". In the case where both values match, the valid data area manager 114 determines that the area of the logical address specified by the host 2 is a valid data area.

The media controller 11 reads data from the media address space 401, that is, from the SCM 12, and transmits the read data to the host 2.

On the other hand, FIG. 12 explains an operation of the media controller 11 in a case where the host 2 requests to read data from an invalid data area in a volatile area on the logical address space 402.

A case in which the host 2 requests to read data from a volatile area (in this case, volatile area #1) on logical address space 402 is assumed. The valid data area manager 114 determines whether or not a value of an entry in the power cycle management table 1142 corresponding to a logical address specified by the host 2 matches a current PC value of volatile area #1 managed in the volatile area management table 1141. Here, the value of the entry in the power cycle management table 1142 is "1" while the current PC value of volatile area #1 managed in the volatile area management table 1141 is "2", and the two values do not match. In the cases where both values do not match, the valid data area manager 114 determines that the area of the logical address specified by the host 2 is an invalid data area. The media controller 11 transmits predetermined data indicating, for example, an error to the host 2 without reading data from the SCM 12.

This prevents reading data from the past that has already been invalidated in the case where, for example, the process 202 accidentally attempts to read data from an area in an indefinite state on the main memory.

Figure 13:
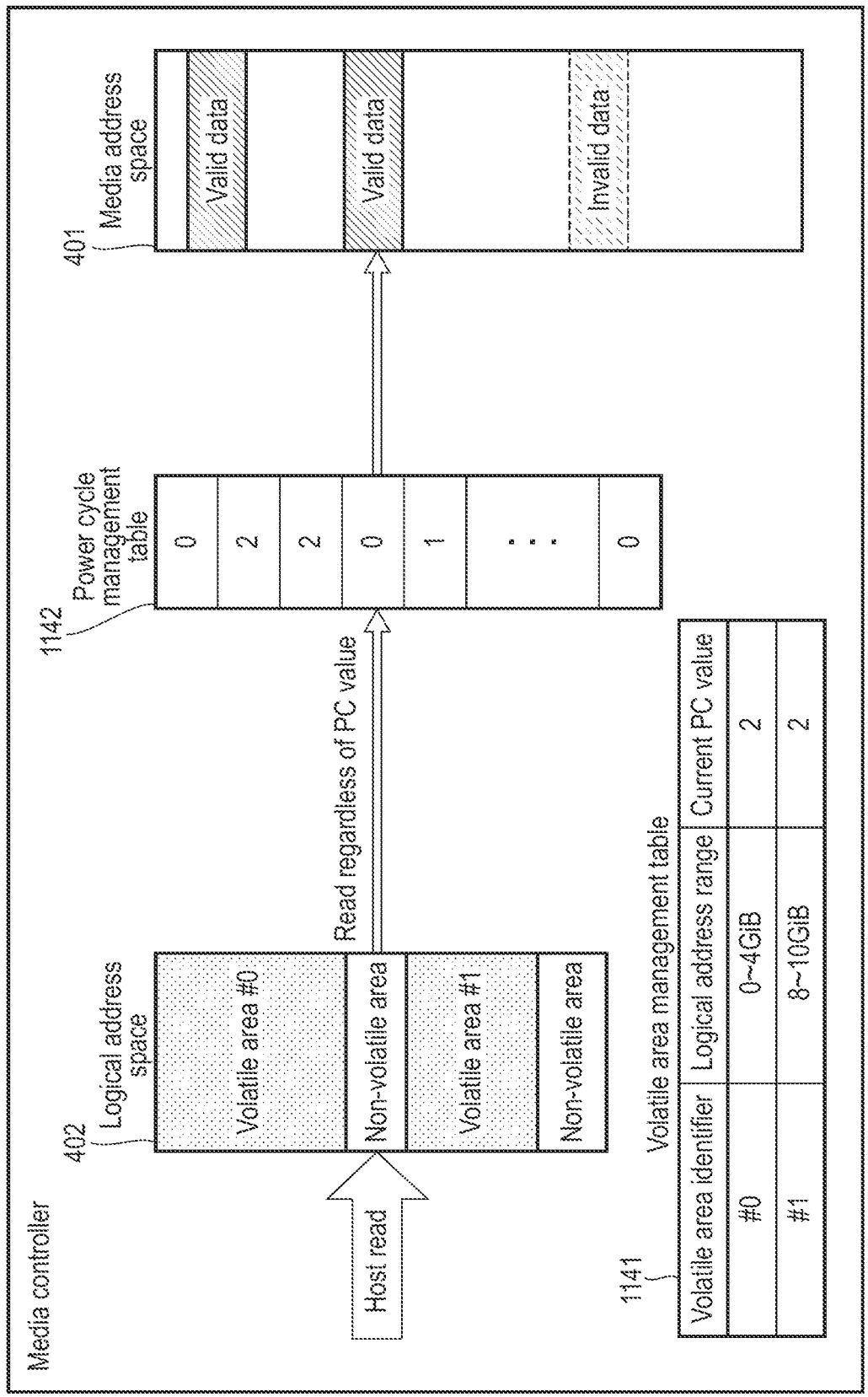
FIG. 13 explains an operation of a case in which a host requests to read data from a non-volatile area on the logical address space in the memory system of the first embodiment.

FIG. 13 explains an operation of the media controller 11 in a case where the host 2 requests to read data from an area in a non-volatile area on the logical address space 402.

As described above, the valid data area manager 114 determines that the non-volatile area on the logical address space 402 is a valid data area, where the stored data is valid data. Therefore, the media controller 11 reads data from the SCM 12 and transmits the read data to the host 2, regardless of the value of the entry in the power cycle management table 1142 corresponding to the logical address specified by the host 2.

The reason why the entries in the power cycle management table 1142 also exist for the non-volatile area on the logical address space 402 is that a volatile area may be established in any range on the logical address space 402. The power cycle management table 1142 may also be a table that manages only the volatile area in a list structure or tree structure.

FIG. 14 is a flowchart showing a read processing procedure executed by the memory system 1 (media controller 11) of the first embodiment.

The media controller 11 receives a read request from the host 2 (S201). The read request includes a logical address of a read target. The media controller 11 determines whether or not data corresponding to the logical address of the read target exists in the buffer (S202). The buffer referred to in S202 may be only the buffer allocated in S207, or may be both the buffer allocated in S207 and the buffer of the write processing (write buffer) described above. In the case where it is only the buffer allocated in S207, the determination of S202 follows the process performed in the case where the release of the buffer in S211 (allocated in S207) is not performed, and in the case where the release of the buffer in S211 is performed, the process proceeds from S201 to S203. The case in which the release of the buffer in S211 is not performed is a case in which the buffer allocated in S207 is used as a read buffer.

In the case where the data exists in the buffer (S202: Yes), the media controller 11 transfers the data in the buffer to the host 2 (S210). Here, the case of proceeding from S202 to S210 is a case in which the data exists in the read buffer or the write buffer. In this case, the media controller 11 does not perform the release of the buffer in S211, but transfers the data in the buffer to the host 2, and then ends the read processing.

In the case where the data does not exist in the buffer (S202: No), the media controller 11 determines whether or not the logical address received from the host 2 is in the volatile area (S203). In the case where the data exists in the volatile area (S203: Yes), the media controller 11 acquires a PC value corresponding to the logical address received from the host 2 from the power cycle management table 1142 (S204). The media controller 11 determines whether or not the acquired PC value matches the current PC value of the relevant volatile area managed in the volatile area management table 1141 (S205). In the case where the PC values do not match (S205: No), the media controller 11 transfers predetermined data indicating an error to the host 2 (S212) and ends the read processing.

In the case where the PC values match (S205: Yes) or in the case where the logical address is not in the volatile area (S203: No), the media controller 11 obtains a media address from the logical address of the read target by address translation by the address translator 111 (S206). The case in which the logical address is not in the volatile area is a case in which it is in the non-volatile area.

The media controller 11 allocates a buffer for storing the read data (S207). As in the case of the write processing described above, the buffer may be provided, for example, on the SRAM in the media controller 11 or on the DRAM connected to the media controller 11. In the case where the process of S211 (releasing the buffer allocated in 207) is not performed, the media controller 11 first allocates a buffer of a size that can store a certain amount of data, and if the buffer is full of data, it repeats processing of discarding the oldest data on the buffer and allocating an area to store newly read data. As mentioned above, the so-called eviction algorithm to evict data from the buffer is not limited to LRU, and various algorithms can be applied, such as LFU.

The media controller 11 reads data from the SCM 12 based on the media address obtained in S206 (S208). The media controller 11 decodes the read data (S209). The decoding of the data is, for example, an error correction using an error correcting code added to the data. In the case where randomization of data is performed in the write processing described above, the media controller 11 performs decoding processing for the randomization in S209.

The media controller 11 transfers the data to the host 2 (S210). If the buffer allocated in S207 is not to be used as a read buffer, the media controller 11 releases the buffer (S211) and ends the read processing.

Figure 15:
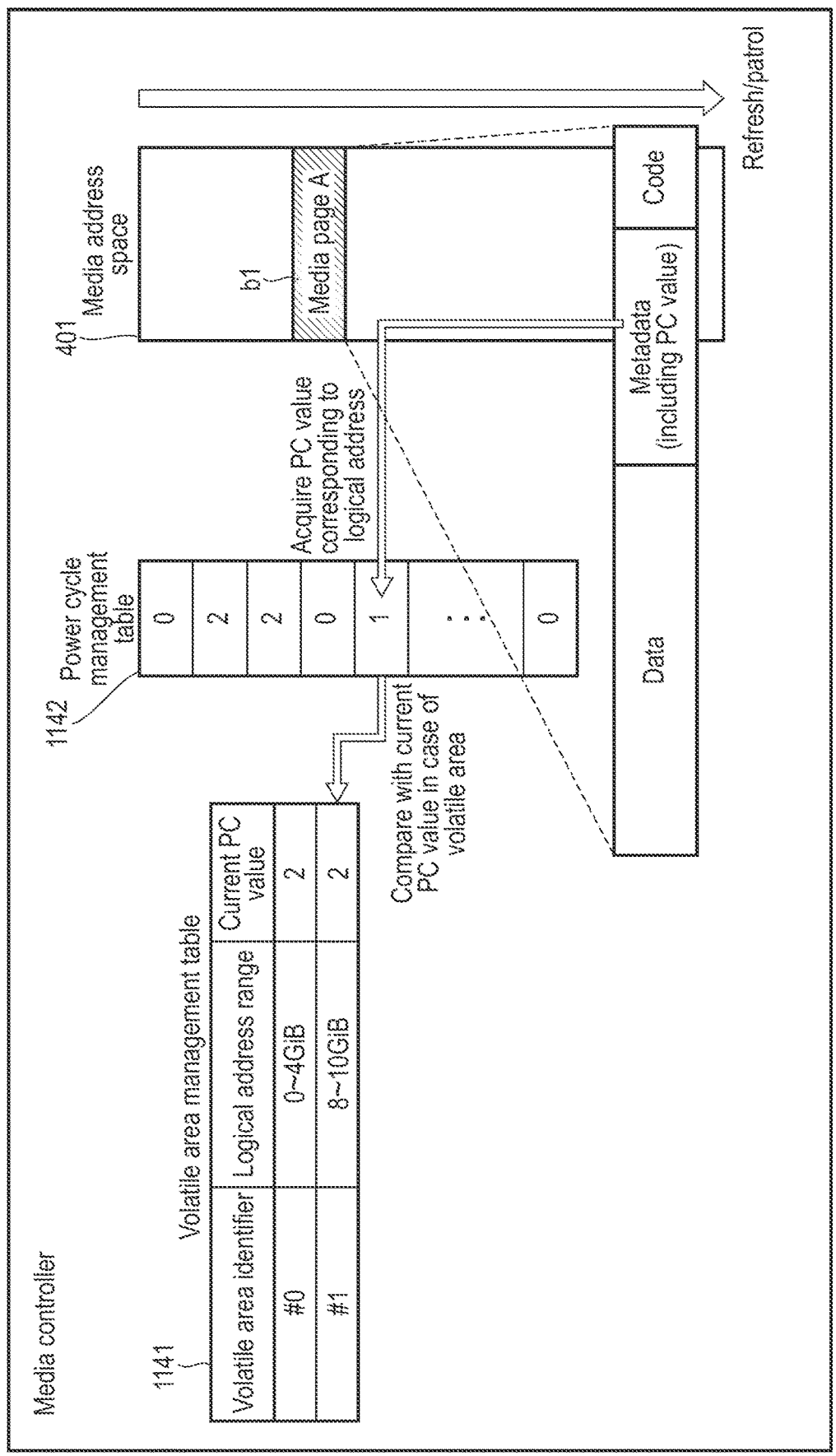
FIG. 15 explains a mechanism by which the memory system of the first embodiment omits parts of refresh processing that are originally unnecessary.

Now, with reference to FIG. 15, the mechanism by which the refresh/patrol controller 112 omits a part of the refresh process that is originally unnecessary will be described.

The refresh/patrol controller 112 cyclically monitors the media address space 401 and detects media pages that require data refreshing. As mentioned above, the method of determining whether or not data refresh is required is not limited to a specific method, and various known methods can be applied. Alternatively, for each media page, refreshing may be executed at predetermined time intervals. Here, it is assumed that media page A (b1) is detected as a page that requires data refresh.

The refresh/patrol controller 112 reads data from the page to be refreshed (in this case, media page A) of the SCM 12. Metadata and a code are added to the data written in the SCM 12. The metadata includes a logical address. In the case where this logical address is a volatile area, the refresh/patrol controller 112 compares the current PC value of the volatile area with the PC value of the logical address. Whether or not the logical address is a volatile area and the current PC value of the volatile area in the case where the logical address is a volatile area can be acquired from the volatile area management table 1141. The PC value of the logical address can be acquired from the power cycle management table 1142.

In the case where the compared values match, the refresh/patrol controller 112 writes the data back to the SCM 12. On the other hand, in the case where the values do not match, the refresh/patrol controller 112 omits the process of writing the data back to the SCM 12. In FIG. 15, the current PC value of the volatile area is "2" while the PC value of the logical address is "1", and since they do not match, the data of media page A is not written back to SCM 12. As mentioned above, the case in which both values do not match is a case in which the data in the media page is unnecessary data from the past.

By omitting the writing back of unnecessary data in the refresh processing, the memory system 1 prevents the endurance of the SCM 12 from being consumed unnecessarily. This allows the life of the SCM 12 to be extended.

FIG. 16 is a flowchart showing the procedure of the refresh/patrol processing executed by the memory system 1 (media controller 11) of the first embodiment. The media controller 11 selects a media address to be refreshed/patrolled (S301). The media controller 11 reads data from the SCM 12 using the selected media address (S302). The media controller 11 decodes the read data (S303). The data read from the SCM 12 is given metadata including a logical address. By referring to the metadata, the media controller 11 can acquire the logical address corresponding to the media address.

The media controller 11 refers to the volatile area management table 1141 to determine whether or not the logical address acquired from the metadata is in the volatile area (S304). In the case where the logical address is in the volatile area (S304: Yes), the media controller 11 acquires a PC value corresponding to the logical address that is added to the read data (S305). The media controller 11 can acquire the PC value from the power cycle management table 1142.

The media controller 11 compares the PC value corresponding to the logical address with the current PC value corresponding to the volatile area (S306). The media controller 11 can acquire the current PC value from the volatile area management table 1141. In the case where both values do not match (S306: No), the media controller 11 ends the refresh processing for the media address selected in S301 without writing the data back to the SCM 12 (S307 to S308).

In the case where the values match (S306: Yes) or in the case where the logical address is not in the volatile area (S304: No), the media controller 11 adds metadata and a code to the data to be written back (S307). The media controller 11 writes the data to the SCM 12 (S308) and ends the refresh processing.

Figure 17:
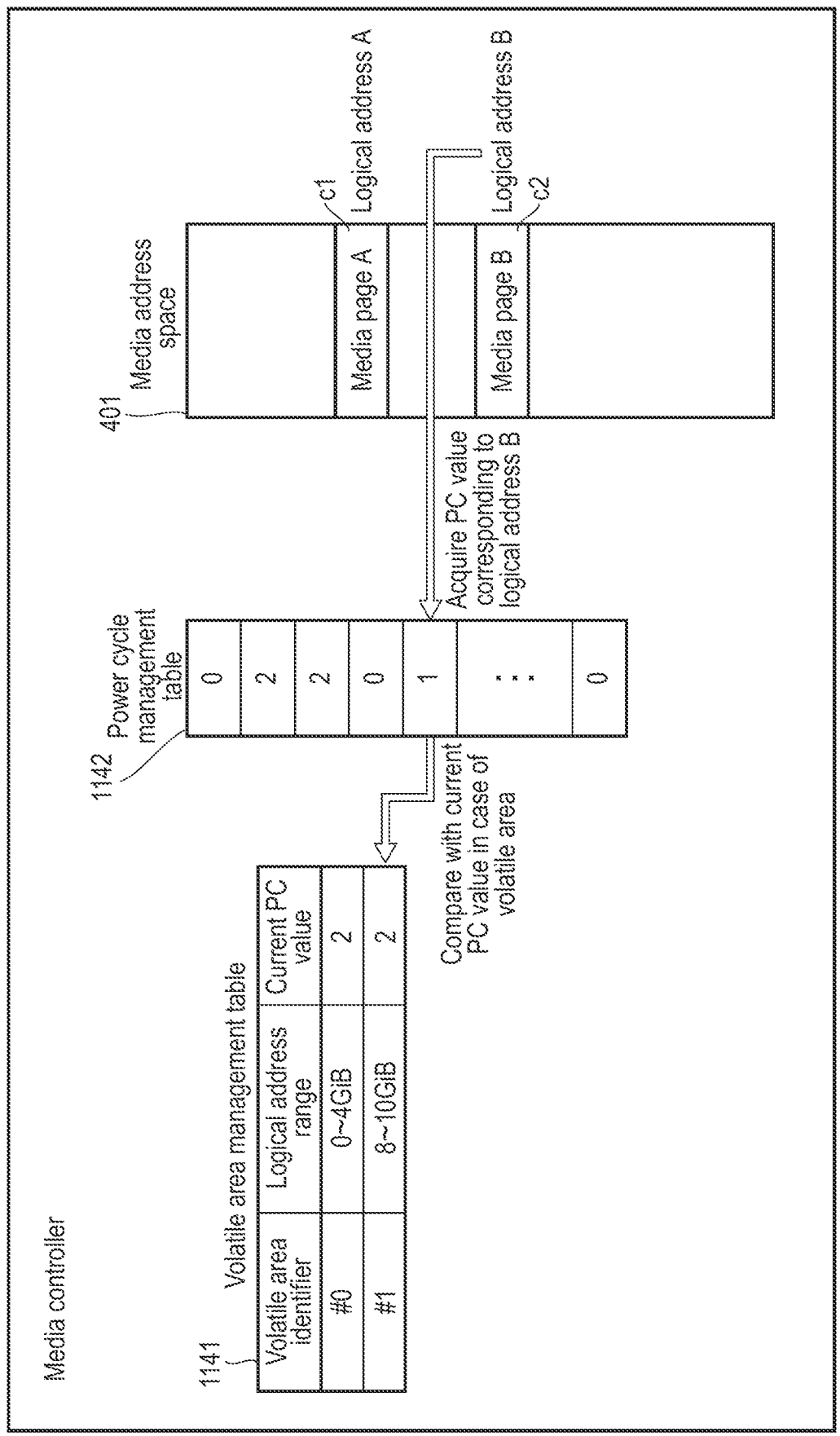
FIG. 17 explains a mechanism by which the memory system of the first embodiment omits parts of wear-leveling processing that are originally unnecessary.

Now, with reference to FIG. 17, the mechanism by which the wear-leveling controller 113 omits a part of the wear-leveling processing that is originally unnecessary will be described.

The wear-leveling controller 113 selects a media page with a high level of exhaustion as a page to be wear leveled, based on the exhaustion information of the media page. The wear-leveling controller 113 selects a media page with a low level of exhaustion as a destination for the data of the page to be wear leveled. Here, it is assumed that media page A (c1) is selected as the source of data movement and media page B (c2) is selected as the destination of data movement. The wear-leveling processing is processing in which a source media page and a destination media page are selected, and data is swapped between the two media pages.

Since the wear-leveling processing involves updating the address translation table 1111 managed by the address translator 111, the wear-leveling controller 113 does not need to consider whether the media page is a volatile area or a non-volatile area when selecting the source media page and the destination media page. In other words, one can be a volatile area and the other can be a non-volatile area.

The wear-leveling controller 113 reads data from each of the media page A and media page B. Here, in order to reduce the load of the wear-leveling processing, for example, it is assumed that the need to write back is determined only for the destination media page. It is also possible to determine whether or not both media pages need to be written back.

The wear-leveling controller 113 writes the data read from media page A to media page B. On the other hand, for media page B, the wear-leveling controller 113 first refers to the volatile area management table 1141 to determine whether or not the logical address included in the metadata is a volatile area. In the case where the logical address is not a volatile area, i.e., it is a non-volatile area, the wear-leveling controller 113 determines at that point that the data in media page B needs to be written back to media page A.

In the case where it is a volatile area, the wear-leveling controller 113 acquires the PC value corresponding to the logical address from the power cycle management table 1142 and compares it with the current PC value of the relevant volatile area managed in the volatile area management table 1141. In the case where both values match, the wear-leveling controller 113 determines that the data in media page B needs to be written back to media page A. In the case where they do not match, the wear-leveling controller 113 determines that it is not necessary to write the data in media page B back to media page A.

As in the case of the aforementioned refresh processing, by omitting the writing back of unnecessary data in the wear-leveling processing, the memory system 1 prevents the endurance of the SCM 12 from being consumed unnecessary. This allows the life of the SCM 12 to be extended.

Figure 18:
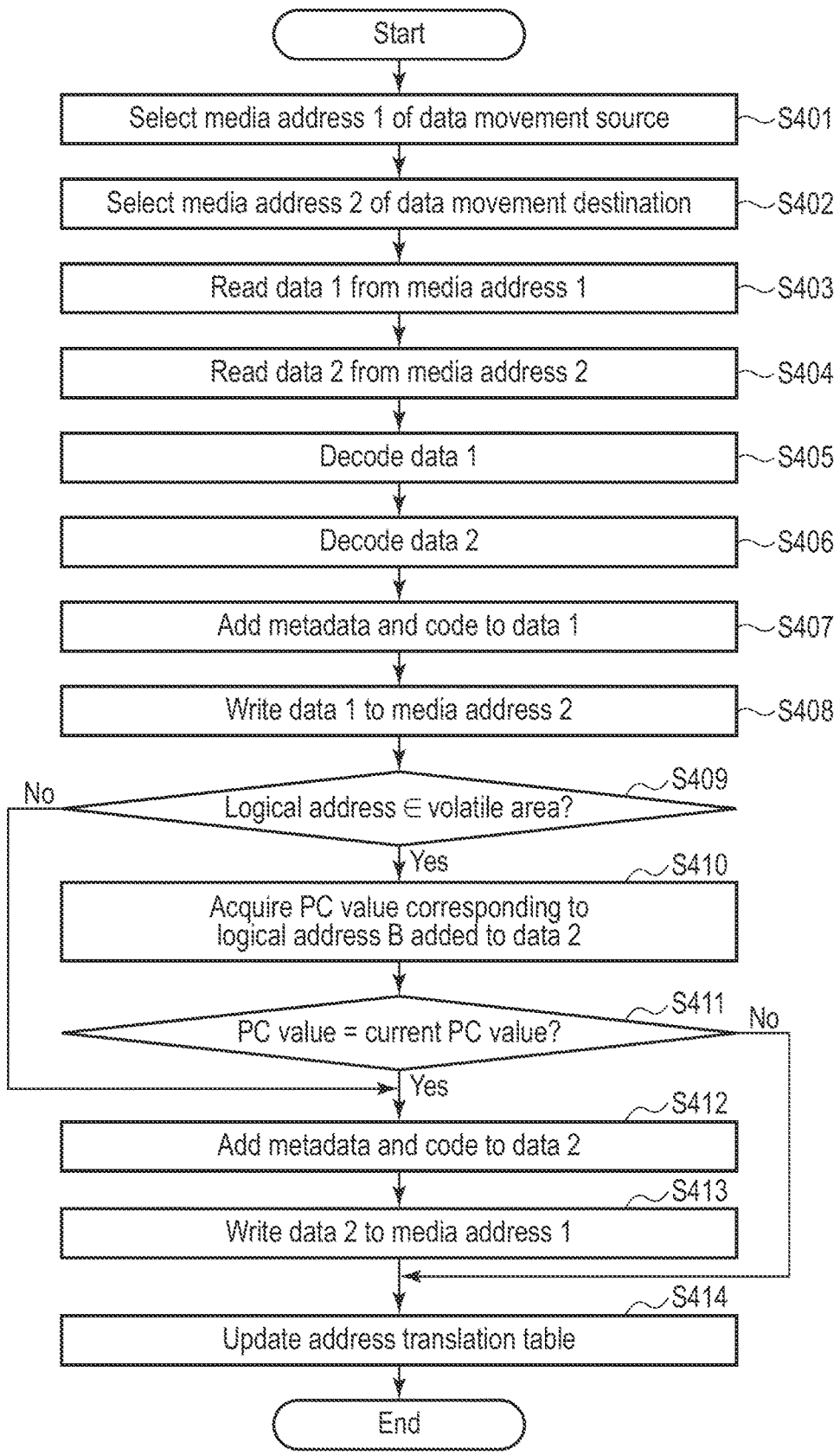
FIG. 18 is a flowchart showing a wear-leveling processing procedure executed by the memory system of the first embodiment.

FIG. 18 is a flowchart showing the procedure of the wear-leveling processing executed by the memory system 1 (media controller 11) of the first embodiment.

The media controller 11 selects media address 1 of the data movement source (S401). Media address 1 is, for example, the address indicating media page A shown in FIG. 17. The media controller 11 also selects media address 2 of the data movement destination (S402). Media address 2 is, for example, the address indicating media page B shown in FIG. 17.

The media controller 11 then reads data 1 from media address 1 (S403), and also reads data 2 from media address 2 (S403). The media controller 11 decodes data 1 (S405) and also decodes data 2 (S406). Then, the media controller 11 adds metadata and a code to data 1 (S407), and writes data 1 to media address 2 (S408).

The media controller 11 then determines whether or not logical address B of data 2 (included in the metadata) is a volatile area (S409). In the case where it is a volatile area (S409: Yes), the media controller 11 acquires the PC value corresponding to logical address B added to data 2 (S410). The media controller 11 compares the acquired PC value with the current PC value of the relevant volatile area (S411). In the case where the values do not match (S411: No), the media controller 11 omits the process of S412 to S413 of writing back data 2 to media address 1, updates the address translation table 1111 (S414), and ends the wear-leveling processing.

In the case where the acquired PC value and the current PC value match (S411: Yes), or in the case where logical address B is not a volatile area (is a non-volatile area) (S409: No), the media controller 11 adds metadata and a code to data 2 (S412), and writes data 2 to media address 1 (S413). Then, the media controller 11 updates the address translation table 1111 (S414) and ends the wear-leveling processing.

Note that the media controller 11 may also perform processes equivalent to S409 to S411 for data 1 as a pre-process to S407. In the case where the media controller 11 comprises a reverse lookup table for translating media addresses to logical addresses, logical addresses A and B may be acquired by the reverse lookup table at the time of reading data 1 in S403 and at the time of reading data 2 in S404 to determine the necessity of reading the data. In this case, unnecessary reading of data can be further reduced.

As described above, by omitting a part of the refresh processing or wear-leveling processing that is originally unnecessary, the memory system 1 of the first embodiment can prevent the endurance of the SCM 12 from being consumed unnecessarily and extend the life of the SCM 12.

Second Embodiment

A second embodiment will now be described.

In the first embodiment, whether a logical page on the logical address space 402 is valid or invalid was determined by managing the written area management information 500 that indicates whether or not a write has been performed by the host 2 after initialization of the main memory (volatile area). Specifically, the power cycle management table 1142 was used to derive each value of the written area management information 500.

In the second embodiment, the area of a DRAM 22 in a host 2 and a part of the area of an SCM 12 in a memory system 1, as shown in FIG. 2, part (B), each form an individual memory space in the host 2, and both of them are assumed to be used as main memories. In other words, it is assumed that an OS 201 of the host 2 manages the SCM 12 as a separate area from the DRAM 22.

In the second embodiment, it is assumed that the OS 201 of the host 2 places physical page management information (page descriptor) regarding the memory space provided by a memory system 1 at a predetermined location on the memory space provided by the memory system 1. Alternatively, the location where the page descriptor is placed may be notified by the host 2. Furthermore, the second embodiment assumes that cache coherency is maintained between a processor 21 of the host 2 and a media controller 11 of the memory system 1, at least for the physical page management information regarding the memory space provided by the memory system 1. As described in the first embodiment, the memory system 1 and the host 2 are connected by an interface compliant with, for example, the CXL specification, which enables cache coherency to be maintained.

Figure 19:
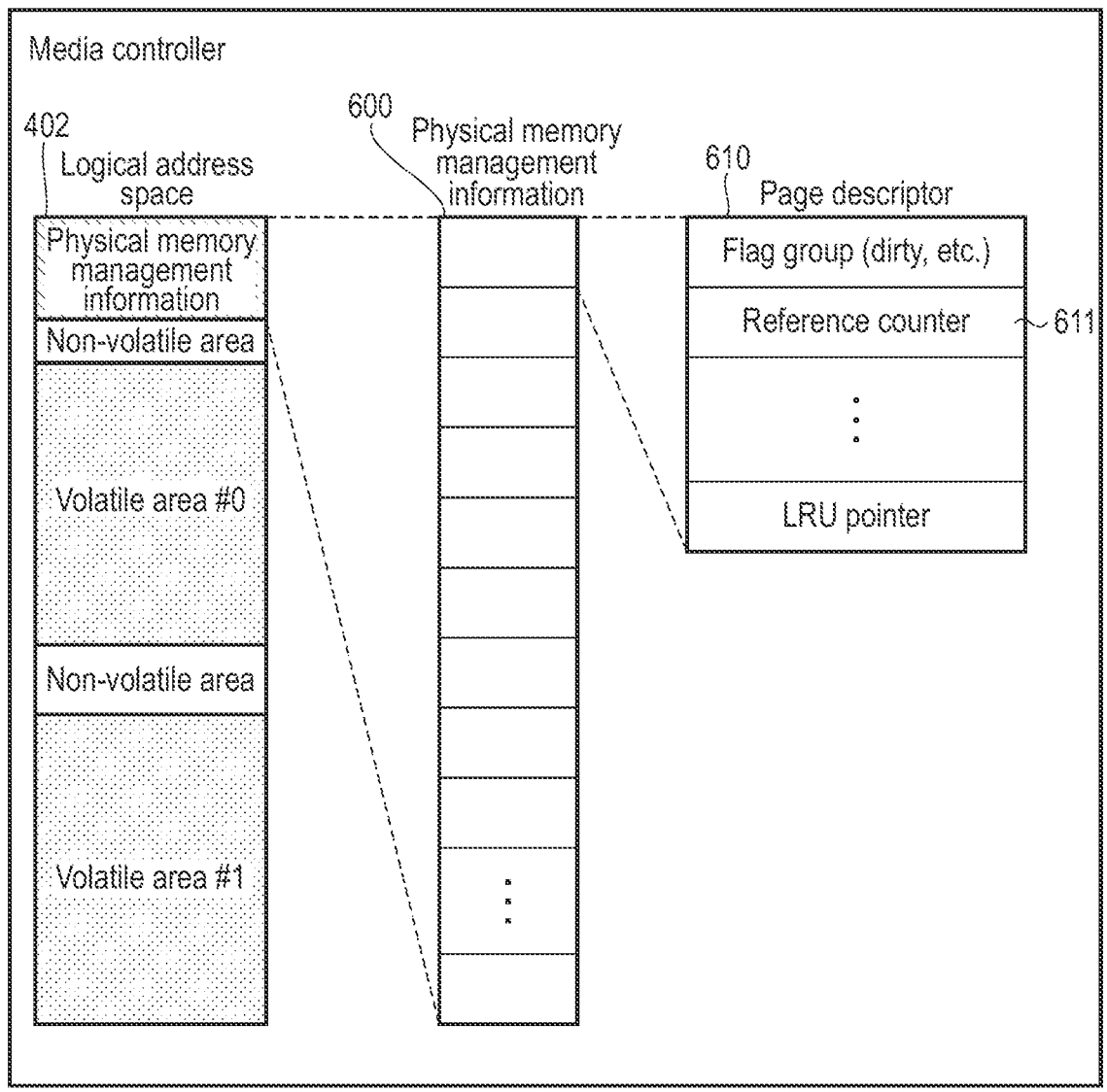
FIG. 19 shows an example of an arrangement of physical page management information in a memory system of a second embodiment.

FIG. 19 shows an example of an arrangement of physical memory management information 600 in the memory system 1 of the second embodiment.

The OS 201 of the host 2, for example, places the physical memory management information 600 at the top on the memory space provided by the memory system 1. Although FIG. 19 shows the placement of the physical memory management information 600 on logical address space 402, the OS 201 of the host 2 places the physical memory management information 600 on physical address space 403 to which the logical address space 402 is mapped.

The physical memory management information 600 includes, for example, page descriptors 610 for the number of physical pages on the physical address space 403. A page descriptor 610 includes a reference counter 611. The reference counter 611 represents the number of physical pages corresponding to the page descriptor that have been allocated to a process or VM at that time. The value of the reference counter is incremented when it is allocated to a process or VM, and decremented when it is released. The value of the reference counter is greater than or equal to 0 in a case where it is allocated to any process or VM.

Therefore, the memory system 1 of the second embodiment uses this reference counter 611 to determine whether a logical page on the logical address space 402 is valid or invalid.

The media controller 11 receives the following information from the host 2, for example, via a register.

(1) Whether or not the page descriptor 610 relating to the memory space provided by the memory system 1 is stored in the memory system 1.

(2) The logical address in which an array of page descriptors 610 is stored.

(3) Size of the page descriptor 610.

(4) Location of the reference counter 611 in the page descriptor 610.

(5) Size of the reference counter 611.

(6) Size of the area on the physical address space 403 corresponding to one page descriptor 610 (not necessarily the same as the size of the physical page).

In the case where it is recognized that the page descriptor 610 is not stored in the memory system 1 by (1) above, the media controller 11 does not determine whether the logical page on the logical address space 402 is valid or invalid, but always executes writing back of the data stored in the logical page selected as the refresh target or wear-leveling target.

With reference to FIG. 20, a mechanism by which a refresh/patrol controller 112 of the second embodiment omits a part of refresh processing that is originally unnecessary is described.

The refresh/patrol controller 112 cyclically monitors media address space 401 and detects media pages that require data refreshing. The refresh/patrol controller 112 reads data from a page to be refreshed in the SCM 12. Metadata and a code are added to the data written in the SCM 12. The metadata includes a logical address.

The refresh/patrol controller 112 determines whether or not this logical address is a volatile area by referring to a volatile area management table 1141. In the case where it is not a volatile area, that is, in the case where it is a non-volatile area, the refresh/patrol controller 112 determines that the read data is valid data at that point. In other words, it executes the writing back of that data to the SCM 12.

On the other hand, in the case where it is a volatile area, the refresh/patrol controller 112 acquires the value of the reference counter in the page descriptor 610 corresponding to the logical address. In the case where this value is equal to or greater than a threshold value (e.g., 0 or greater), the refresh/patrol controller 112 determines that the read data is valid data. In other words, it executes the writing back of that data to the SCM 12. In the case where the value of the reference counter is less than the threshold value, the refresh/patrol controller 112 determines that the read data is invalid data and omits writing it back to the SCM 12.

By omitting the writing back of unnecessary data in the refresh processing, the memory system 1 prevents the endurance of the SCM 12 from being consumed unnecessarily. This allows the life of the SCM 12 to be extended.

The wear-leveling controller 113 of the second embodiment also determines the validity or invalidity of the data stored in the wear-leveling target page in the same manner as the refresh/patrol controller 112, and omits the writing back of invalid data to the SCM 12. By omitting the writing back of unnecessary data in the wear-leveling processing as well, the memory system 1 can prevent the endurance of the SCM 12 from being consumed unnecessarily and extend the life of the SCM 12.

Furthermore, also in the second embodiment, the memory system 1 can prevent, for example, the reading out of past data that has already been invalidated in the case where a process 202 operating in the host 2 accidentally tries to read out data from an area in an indefinite state on the main memory.

FIG. 21 is a flowchart showing a write processing procedure executed by the memory system 1 (media controller 11) of the second embodiment.

The media controller 11 receives a write request from the host 2 (S501). The write request includes the logical address of a write destination and data. The media controller 11 registers the data received from the host 2 into a buffer (S502). In a case where data corresponding to the same logical address (logical address received from host 2) has already been registered in the buffer, the media controller 11 overwrites the data on the buffer.

The media controller 11, for example, writes the oldest data on the buffer to the SCM 12 in a case where the buffer is full of data. In the case where the media controller 11 writes the data to the SCM 12 (S503: Yes), the media controller 11 obtains a media address from the logical address of the write destination by address translation by an address translator 111 (S504).

In addition, the media controller 11 adds metadata and a code to the data to be written (S505). In S505, the media controller 11 may randomize the data (swap bit positions), etc. Furthermore, the media controller 11 updates exhaustion information of the area (media page) on the media address space 401 indicated by the media address (S506).

The media controller 11 writes data to the SCM 12 (S507) and releases the buffer (S508). With the release of the buffer, the media controller 11 ends the write processing. On the other hand, in the case where the buffer is not full of data and no data is to be written to the SCM12 (S503: No), the media controller 11 ends the write processing with the registration of data to the buffer in S502.

The above procedure of the write processing in the second embodiment is the procedure of the write processing in the first embodiment shown in FIG. 7, excluding the process of updating the power cycle management table in S107.

FIG. 22 is a flowchart showing a read processing procedure executed by the memory system 1 (media controller 11) of the second embodiment.

The media controller 11 receives a read request from the host 2 (S601). The read request includes the logical address of a read target. The media controller 11 determines whether or not data corresponding to the logical address to be read exists in the buffer (S602). In the case where the data exists in the buffer (S602: Yes), the media controller 11 transfers the data in the buffer to the host 2 (S610). In the case where the data is to be acquired from the buffer, the media controller 11 does not perform release of the buffer in S611, and ends the read processing after transferring the data in the buffer to the host 2.

In the case where the data does not exist in the buffer (S602: No), the media controller 11 determines whether or not the logical address received from the host 2 is in a volatile area (S603). In the case where it is in the volatile area (S603: Yes), the media controller 11 acquires a reference count corresponding to the logical address (S604). The media controller 11 determines whether or not the acquired reference count is equal to or greater than a threshold value (S605). In the case where it is less than the threshold value (S605: No), the media controller 11 transfers predetermined data indicating an error to the host 2 (S605), and ends the read processing.

In the case where the reference count is equal to or greater than the threshold value (S605: Yes), or in the case where the logical address is not in the volatile area (S603: No), the media controller 11 obtains a media address from the logical address to be read by address translation by the address translator 111 (S606). The media controller 11 allocates a buffer to store the read data (S607) and reads data from the SCM 12 based on the media address obtained in S606 (S608).

The media controller 11 decodes the read data (S609) and transfers the data to the host 2 (S610). If the buffer allocated in S607 is not to be used as a read buffer, the media controller 11 releases the buffer (S611) and ends the read processing.

The above procedure of the read processing in the second embodiment is the procedure of the read processing in the first embodiment shown in FIG. 14, except that the process of determining the validity or invalidity using the PC value in S204 to S205 is replaced by the process of determining the validity or invalidity using the reference count in S605 to S606. FIG. 23 is a flowchart showing a refresh/patrol processing procedure executed by the memory system 1 (media controller 11) of the second embodiment.

The media controller 11 selects a media address to be refreshed/patrolled (S701). The media controller 11 reads data from the SCM 12 using the selected media address (S702). The media controller 11 decodes the read data (S703).

The media controller 11 refers to the volatile area management table 1141 to determine whether or not the logical address acquired from the metadata is in the volatile area (S704). In the case where it is in the volatile area (S704: Yes), the media controller 11 acquires the reference count corresponding to the logical address added to the read data (S705).

The media controller 11 determines whether or not the acquired reference count is equal to or greater than a threshold value (S706). In the case where it is less than the threshold value (S706: No), the media controller 11 ends the refresh processing for the media address selected in S701 without writing the data back to the SCM 12 (S707 to S708).

In the case where the reference count is equal to or greater than the threshold value (S706: No), or in the case where the logical address was not in the volatile area (S704: No), the media controller 11 adds metadata and a code to the data to be written back (S707). The media controller 11 writes the data to the SCM 12 (S708) and ends the refresh processing.

The above procedure of the refresh/patrol processing in the second embodiment is the procedure of the refresh/patrol processing in the first embodiment shown in FIG. 16, except that the process of determining validity or invalidity using the PC value in S304 to S305 is replaced by the process of determining validity or invalidity using the reference count in S705 to S706.

Figure 24:
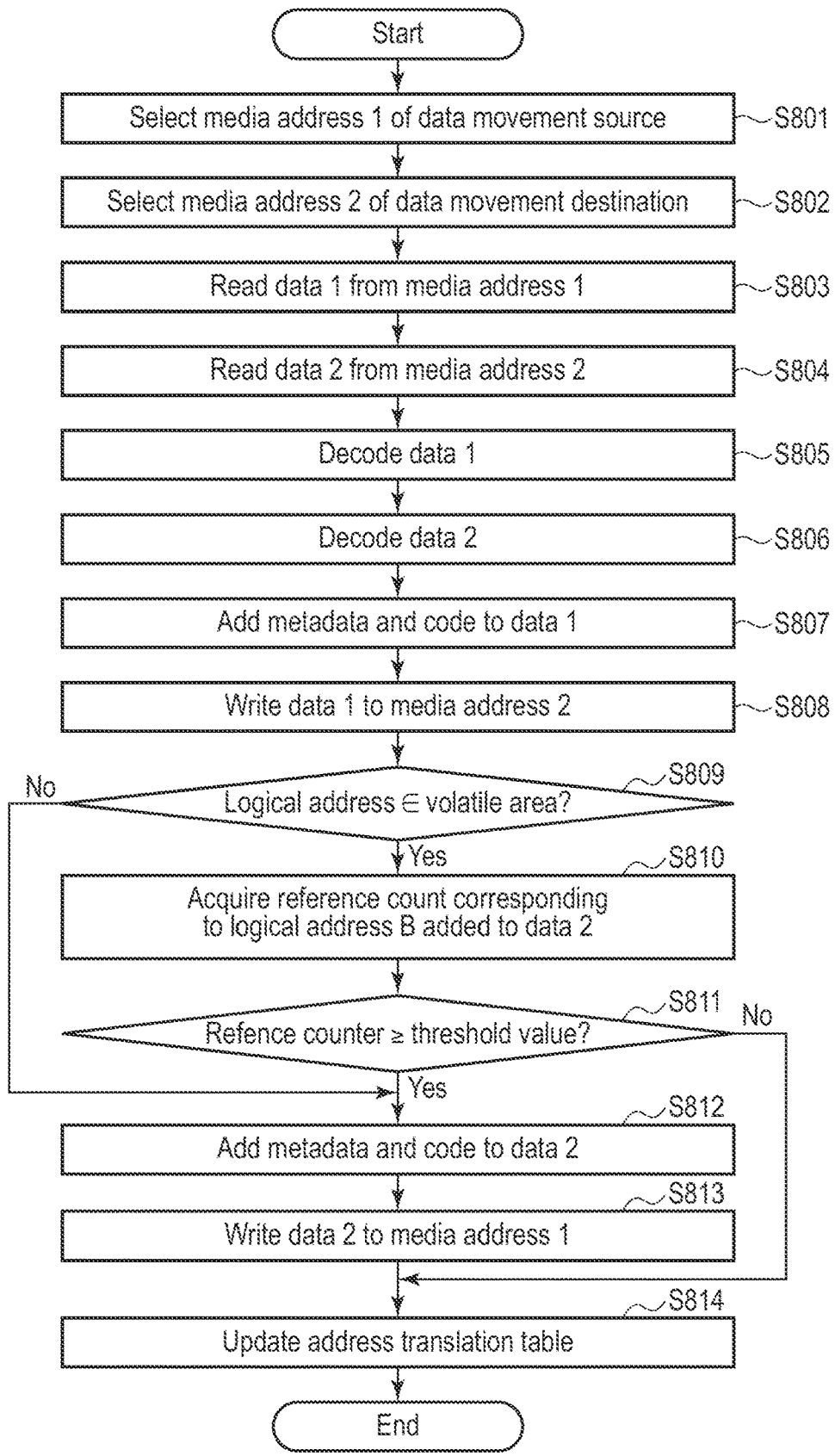
FIG. 24 is a flowchart of a wear-leveling processing procedure executed by the memory system of the second embodiment.

FIG. 24 is a flowchart showing a wear-leveling processing procedure executed by the memory system 1 (media controller 11) of the second embodiment.

The media controller 11 selects media address 1 of the data movement source (S801). The media controller 11 also selects media address 2 of the data movement destination (S802).

The media controller 11 then reads data 1 from media address 1 (S803) and also reads data 2 from media address 2 (S803). The media controller 11 decodes data 1 (S805) and also decodes data 2 (S806). The media controller 11 then adds metadata and a code to data 1 (S807), and writes data 1 to media address 2 (S808).

Subsequently, the media controller 11 determines whether or not logical address B of data 2 is a volatile area (S809). In the case where it is a volatile area (S809: Yes), the media controller 11 acquires a reference count corresponding to logical address B added to data 2 (S810). The media controller 11 determines whether or not the acquired reference count is greater than or equal to a threshold value (S811). In the case where it is less than the threshold value (S811: No), the media controller 11 updates the address translation table 1111 (S814) and ends the wear-leveling processing.

In the case where it is greater than or equal to the threshold value (S811: Yes), or in the case where logical address B is not a volatile area (S809: No), the media controller 11 adds metadata and a code to data 2 (S812), and writes data 2 to media address 1 (S813). The media controller 11 updates the address translation table 1111 (S814) and ends the wear-leveling processing.

Note that, as in the first embodiment, the media controller 11 may also perform processes equivalent to S809 to S811 for data 1 as a pre-process to S807. In the case where the media controller 11 comprises a reverse lookup table for translating media addresses to logical addresses, logical addresses A and B may be acquired by the reverse lookup table at the time of reading data 1 in S803 and at the time of reading data 2 in S804 to determine whether or not the data needs to be read. In this case, unnecessary reading of data can be further reduced.

The above procedure of the wear-leveling processing in the second embodiment is the procedure of the wear-leveling processing in the first embodiment shown in FIG. 18, except that the process of determining validity or invalidity using the PC value in S410 to S411 is replaced by the process of determining validity or invalidity using the reference count in S810 to S811.

As described above, by omitting a part of the refresh processing or wear-leveling processing that is originally unnecessary, the memory system 1 of the second embodiment can also prevent the endurance of the SCM 12 from being consumed unnecessarily and extend the life of the SCM 12.

Figure 25:
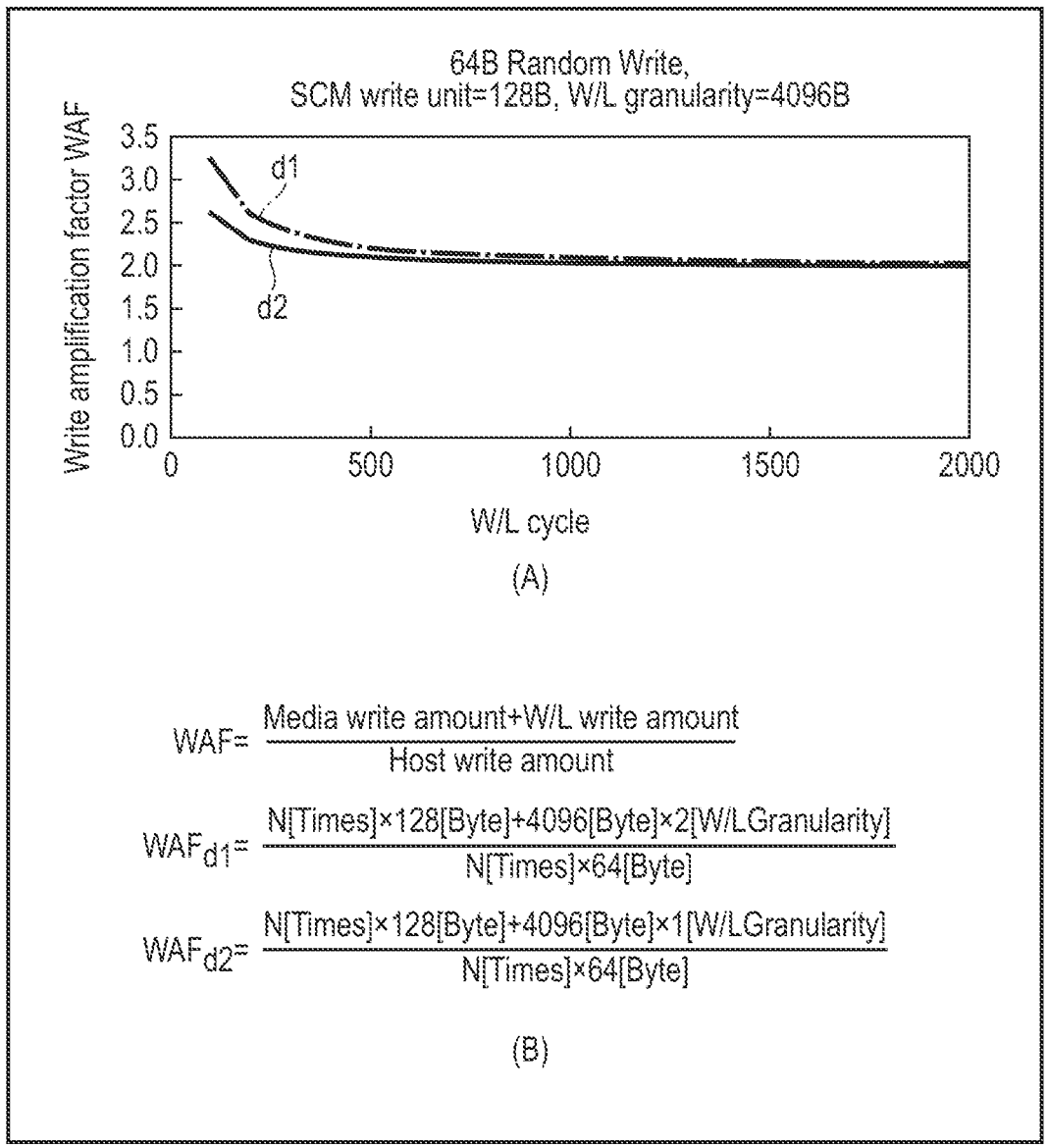
FIG. 25 shows an example of a WAF reduction effect of the memory system of the first or second embodiment.

FIG. 25 shows an example of a write amplification factor (WAF) reduction effect of the memory system 1 of the first or second embodiment.

FIG. 25, part (A) shows a wear-leveling cycle (the number of times data is written from the host 2 to the memory system 1 between the time when certain data is moved by the wear-leveling processing and the time when the same data is moved again by the wear-leveling processing) on a horizontal axis, and a write amplification factor by the wear-leveling processing on a vertical axis. Graph (d1) shows a case in which writing back data in the invalid data area is performed, and graph (d2) shows a case in which writing back data in the invalid data area is omitted in the case of assuming that the area selected as the destination of moving data in the wear-leveling processing is always the invalid data area.

FIG. 25, part (B) shows a calculation formula of a write amplification factor (WAF) by the wear-leveling processing. A media write amount is an amount of data that the media controller 11 has written to the SCM 12 in response to a command from the host 2. A W/L write amount is an amount of data that the media controller 11 has written to the SCM 12 for the wear-leveling processing. The media controller 11, for example, executes the writing of data to the SCM 12 in units of 128 bytes, and also executes the wear-leveling processing at a granularity of 4096 bytes for the data stored in the SCM 12. A host write amount is an amount of data written to memory system 1 by host 2.

$WAF_{d1}$ shows an example of applying the value in the case of performing data write back in the invalid data area (graph d1) as the W/L write amount upon calculation of the WAF. On the other hand, $WAF_{d2}$ shows an example of applying the value in the case of omitting data write back in the invalid data area (graph d2) as the W/L write amount upon calculation of the WAF.

As represented by graphs d1 and d2 in FIG. 25, part (A), in the case of omitting the writing back of data in the invalid data area, the write amplification factor by the wear-leveling processing can be reduced compared to the case of writing back data in the invalid data area. The reduction rate of the write amplification factor in the case where the wear-leveling cycle is 100 is 19.5%, and the reduction rate of the write amplification factor in the case where the wear-leveling cycle is 1000 is 3%. Therefore, a particularly high effect can be expected in the case where the wear-leveling cycle is short.

In addition, although FIG. 25 shows the reduction effect of the WAF by the wear-leveling processing, by omitting the writing back of data in the invalid data area, the memory system 1 of the first or second embodiment can also reduce the write amplification factor by the refresh processing in comparison to the case of writing back data in the invalid data area.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a non-volatile memory; and
a controller configured to control writing of data to the non-volatile memory or reading of data from the non-volatile memory in response to a command from a host, wherein
the controller is configured to
manage a first area and a second area in a memory space provided to the host, to which an area of the non-volatile memory is mapped, the first area being an area used by the host as a main memory, the second area being an area where valid data is stored,
execute wear-leveling processing to swap data in order to level out exhaustion of the non-volatile memory; and
in the wear-leveling processing, in a case where data read from the non-volatile memory is data in an area other than the second area, omit writing of the read data to the non-volatile memory, or omit reading of data from an area other than the second area of the non-volatile memory and writing of the data to the non-volatile memory.

2. The memory system of claim 1, wherein the controller is configured to determine that the second area includes an area other than the first area and an area in the first area that is accessed by the host after the host initializes the main memory.

3. The memory system of claim 2, wherein, in a case of being accessed by the host, the controller is configured to:
manage first information for each predetermined unit area on the non-volatile memory including at least the first area, the first information being updated to a value indicating of the access from the host after the initialization of the main memory; and
determine whether or not the area is included in the second area by referring to the first information.

4. The memory system of claim 2, wherein the controller is configured to:
monitor second information stored in a third area on the memory space and used for managing the memory space by the host; and
determine whether or not the area is included in the second area by referring to a counter included the second information for each predetermined unit area on the memory space, the counter being incremented when allocated to a program running on the host and decremented when released.

5. The memory system of claim 1, wherein the controller is configured to, in a case of being notified by the host of an area on the memory space where data is no longer required, exclude the notified area from the second area.

6. The memory system of claim 1, wherein the controller is connected to the host by an interface that has a function to maintain cache coherency between the memory system and the host.

7. A memory system comprising:
a non-volatile memory; and
a controller configured to control writing of data to the non-volatile memory or reading of data from the non-volatile memory in response to a command from a host, wherein the controller is configured to
manage a first area and a second area in a memory space provided to the host, to which an area of the non-volatile memory is mapped, the first area being an area used by the host as a main memory, the second area being an area where valid data is stored,
execute refresh processing to write back data stored in the non-volatile memory; and
in the refresh processing, in a case where data read from the non-volatile memory is data in an area other than the second area, omit writing of the read data to the non-volatile memory, or omit reading of data from an area other than the second area of the non-volatile memory and writing of the data to the non-volatile memory.

8. The memory system of claim 7, wherein the controller is configured to determine that the second area includes an area other than the first area and an area in the first area that is accessed by the host after the host initializes the main memory.

9. The memory system of claim 8, wherein, in a case of being accessed by the host, the controller is configured to:
manage first information for each predetermined unit area on the non-volatile memory including at least the first area, the first information being updated to a value indicating of the access from the host after the initialization of the main memory; and
determine whether or not the area is included in the second area by referring to the first information.

10. The memory system of claim 8, wherein the controller is configured to:
monitor second information stored in a third area on the memory space and used for managing the memory space by the host; and
determine whether or not the area is included in the second area by referring to a counter included the second information for each predetermined unit area on the memory space, the counter being incremented when allocated to a program running on the host and decremented when released.

11. The memory system of claim 7, wherein the controller is configured to, in a case of being notified by the host of an area on the memory space where data is no longer required, exclude the notified area from the second area.

12. The memory system of claim 7, wherein the controller is connected to the host by an interface that has a function to maintain cache coherency between the memory system and the host.

13. The memory system of claim 1, wherein the controller is configured to, in response to a read command from the host, transmit predetermined data indicating an error to the host in a case where an area specified by the read command is an area other than the second area.

14. The memory system of claim 13, wherein the controller is configured to determine that the second area includes an area other than the first area and an area in the first area that is accessed by the host after the host initializes the main memory.

15. The memory system of claim 14, wherein, in a case of being accessed by the host, the controller is configured to:
manage first information for each predetermined unit area on the non-volatile memory including at least the first area, the first information being updated to a value indicating of the access from the host after the initialization of the main memory; and
determine whether or not the area is included in the second area by referring to the first information.

16. The memory system of claim 14, wherein the controller is configured to:
monitor second information stored in a third area on the memory space and used for managing the memory space by the host; and determine whether or not the area is included in the second area by referring to a counter included the second information for each predetermined unit area on the memory space, the counter being incremented when allocated to a program running on the host and decremented when released.

17. The memory system of claim 13, wherein the controller is configured to, in a case of being notified by the host of an area on the memory space where data is no longer required, exclude the notified area from the second area.

18. The memory system of claim 13, wherein the controller is connected to the host by an interface that has a function to maintain cache coherency between the memory system and the host.

19. The memory system of claim 1, wherein the controller is connected to the host by an interface that has a function to maintain cache coherency between the memory system and the host.

\* \* \* \* \*